US 7,680,148 B2

(12) United States Patent  (10) Patent No.: US 7,680,148 B2
Nishibayashi et al.  (45) Date of Patent: Mar. 16, 2010

(54) COMMUNICATION APPARATUS AND COMMUNICATION METHOD

(75) Inventors: Yasuyuki Nishibayashi, Kawasaki (JP); Masahiro Takagi, Tokyo (JP); Tomoko Adachi, Urayasu (JP); Tomoya Tandai, Tokyo (JP); Tetsu Nakajima, Yokohama (JP); Yoriko Utsunomiya, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 133 days.

(21) Appl. No.: 12/054,945

(22) Filed: Mar. 25, 2008

(65) Prior Publication Data

US 2008/0181251 A1  Jul. 31, 2008

Related U.S. Application Data

(62) Division of application No. 11/200,103, filed on Aug. 10, 2005.

(30) Foreign Application Priority Data

Aug. 11, 2004  (JP)  ............................ 2004-234814

(51) Int. Cl.
*H04J 3/16* (2006.01)
(52) U.S. Cl. .................................................. 370/465
(58) Field of Classification Search ................. 370/445, 370/394, 465; 714/749, 750
See application file for complete search history.

(56) References Cited

U.S. PATENT DOCUMENTS

| 5,329,531 | A | 7/1994 | Diepstraten et al. |
| 6,577,609 | B2 | 6/2003 | Sharony |
| 2003/0067890 | A1 | 4/2003 | Goel et al. |
| 2003/0135640 | A1 | 7/2003 | Ho et al. |
| 2003/0169769 | A1 | 9/2003 | Ho et al. |
| 2003/0214930 | A1 | 11/2003 | Fischer |
| 2005/0135284 | A1* | 6/2005 | Nanda et al. ............... 370/294 |

(Continued)

FOREIGN PATENT DOCUMENTS

JP        9-186740        7/1997

(Continued)

OTHER PUBLICATIONS

Jean Lorchat, et al., "Energy Saving in IEEE 802.11 Communications using Frame Aggregation", Globecom 2003, IEEE. vol. 3, Dec. 5, 2003, pp. 1296-1300.
U.S. Appl. No. 11/853,437, filed Sep. 11, 2007, Hirano, et al.
"Computer Network", Xie Xiren, fourth edition, Jun. 2003, 1 front page and p. 72.

*Primary Examiner*—Kevin C Harper
*Assistant Examiner*—Sai-Ming Chan
(74) *Attorney, Agent, or Firm*—Oblon, Spivak, McClelland, Maier & Neustadt, L.L.P.

(57) ABSTRACT

A communication apparatus includes a receiving device configured to receive one physical frame in which a plurality of MAC frames are aggregated. This physical frame includes one acknowledgement request frame for the plurality of MAC frames. The apparatus includes an acknowledgement frame forming device configured to form an acknowledgement frame representing reception statuses of the plurality of MAC frames in response to the acknowledgement request frame. The apparatus also includes a transmitting device configured to transmit the acknowledgement frame. This acknowledgement frame includes a compressed acknowledgement frame representing an acknowledgement bitmap having a size equal to a maximum number of MSDUs (MAC Service Data Units) when one MPDU (MAC Protocol Data Unit) corresponds to one MSDU.

12 Claims, 29 Drawing Sheets

U.S. PATENT DOCUMENTS

| | | |
|---|---|---|
| 2005/0157715 A1 * | 7/2005 | Hiddink et al. ............. 370/389 |
| 2005/0165950 A1 | 7/2005 | Takagi et al. |
| 2005/0195858 A1 | 9/2005 | Nishibayashi et al. |
| 2005/0220145 A1 | 10/2005 | Nishibayashi et al. |
| 2005/0238016 A1 | 10/2005 | Nishibayashi et al. |
| 2005/0265302 A1 | 12/2005 | Nishibayashi et al. |
| 2006/0083233 A1 | 4/2006 | Nishibayashi et al. |
| 2006/0092871 A1 | 5/2006 | Nishibayashi et al. |
| 2007/0014237 A1 | 1/2007 | Nishibayashi et al. |

FOREIGN PATENT DOCUMENTS

| | | |
|---|---|---|
| JP | 2002-314546 | 10/2002 |
| JP | 2004-536502 | 12/2004 |
| JP | 2005-184839 | 7/2005 |
| WO | WO 02/089413 A1 | 11/2002 |
| WO | WO 2005/083951 A1 | 9/2005 |

* cited by examiner

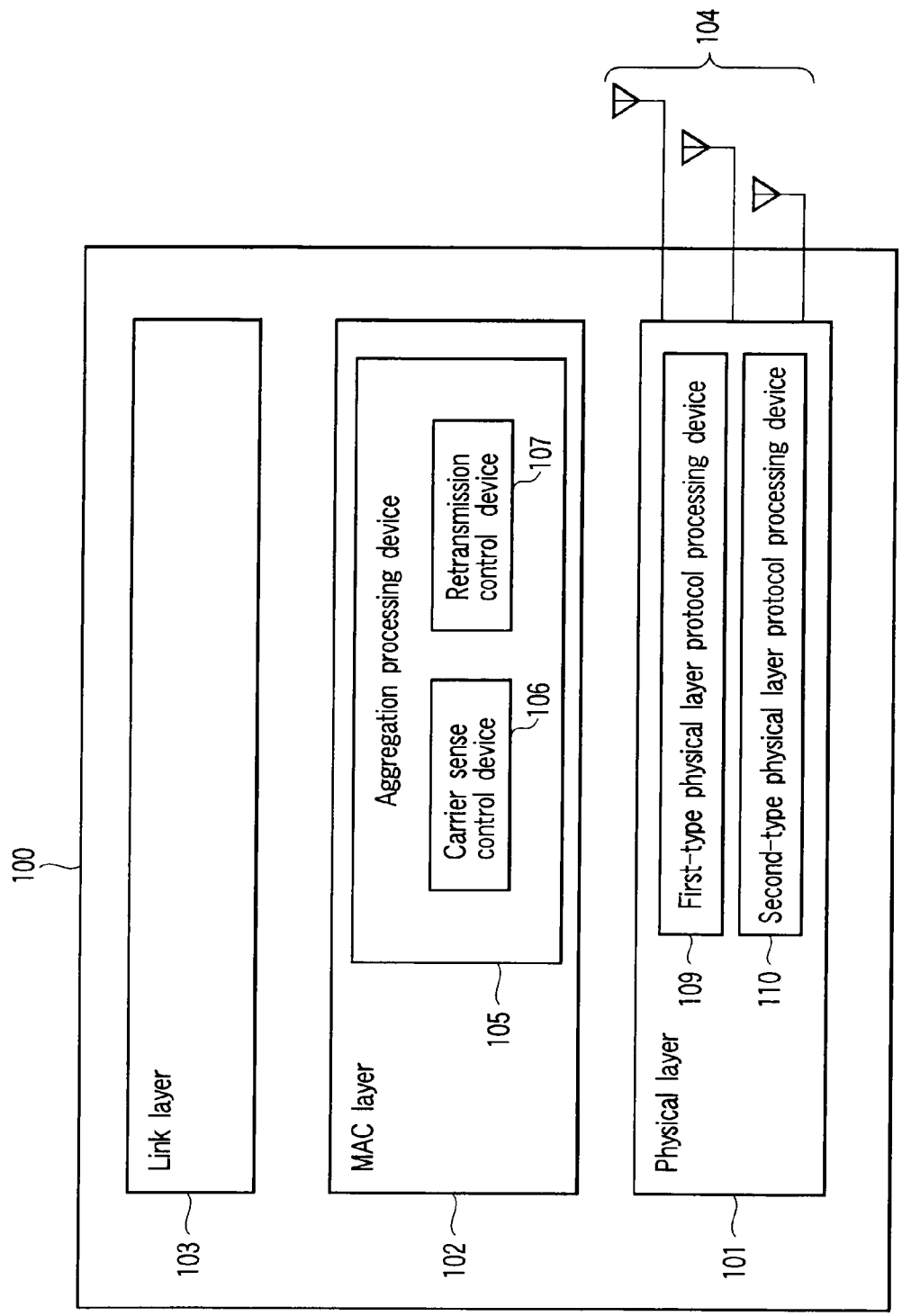
F I G. 1

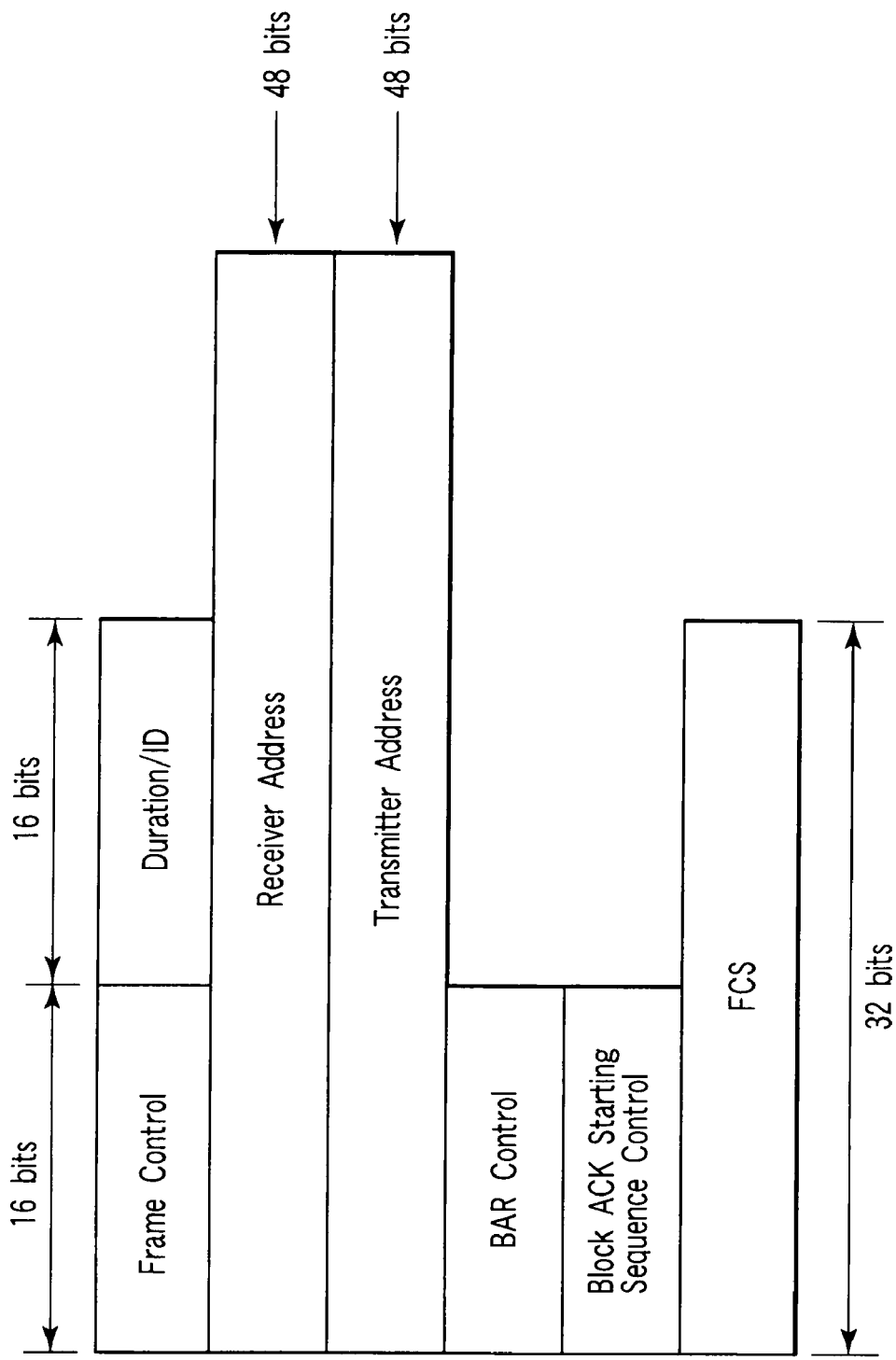
F I G. 2 ered in 1999, 54 Mbps) exists as a standard. In order to develop standard specifications directed to further increase communication speeds in both the 2.4 GHz band and the 5 GHz band, IEEE802.11 TGn (Task Group n) has already been established.

COMMUNICATION APPARATUS AND COMMUNICATION METHOD

CROSS-REFERENCE TO RELATED APPLICATIONS

The present application is a divisional of U.S. application Ser. No. 11/200,103, filed Aug. 10, 2005 which claims the benefit of priority from prior Japanese Patent Application No. 2004-234814, filed Aug. 11, 2004, the entire contents of each are incorporated herein by reference.

BACKGROUND OF THE INVENTION

1. Field of the Invention

The present invention relates to a communication apparatus and communication method which perform media access control on the basis of the carrier sense information of a physical layer and the carrier sense information of a MAC layer.

2. Description of the Related Art

Media access control (MAC) is control for causing a plurality of communication apparatuses which perform communication while sharing the same medium to decide how to use the medium in transmitting communication data. Owing to media access control, even if two or more communication apparatuses transmit communication data by using the same medium at the same time, there is less chance of the occurrence of a phenomenon (collision) in which a communication apparatus on the receiving side cannot decode communication data. Media access control is also a technique for controlling access from communication apparatuses to a medium so as to minimize the chance of the occurrence of a phenomenon in which, despite the presence of communication apparatuses having transmission requests, the medium is not used by any of the communication apparatuses.

In particularly wireless communication, however, media access control (MAC) which is not premised on collision detection is required because it is difficult for a communication apparatus to monitor transmission data while transmitting the data. IEEE802.11 is a typical technical standard for wireless LANs, and uses CSMA/CA (Carrier Sense Multiple Access with Collision Avoidance). According to CSMA/CA in IEEE802.11, in the header of a MAC frame, a period (duration) until the end of a sequence comprising one or more frame exchanges following the frame is set. In this period, a communication apparatus which is irrelevant to the sequence and has no transmission right waits for transmission upon determining a virtual busy state of the medium. This prevents the occurrence of collision. On the other hand, a communication apparatus which has a transmission right in this sequence recognizes that the wireless medium is not used except for a period during which the medium is actually used. IEEE802.11 defines that the state of a medium is determined on the basis of such a combination of virtual carrier sense on a MAC layer and physical carrier sense on a physical layer, and media access control is performed on the basis of the determination.

IEEE802.11 using CSMA/CA has increased the communication speed mainly by changing the physical layer protocol. With regard to the 2.4 GHz band, there have been changes from IEEE802.11 (established in 1997, 2 Mbps) to IEEE802.11b (established in 1999, 11 Mbps), and further to IEEE802.11g (established in 2003, 54 Mbps). With regard to the 5 GHZ band, only IEEE802.11a (established in 1999, 54 Mbps) exists as a standard. In order to develop standard specifications directed to further increase communication speeds in both the 2.4 GHz band and the 5 GHz band, IEEE802.11 TGn (Task Group n) has already been established.

In addition, several access control techniques designed to improve QoS (Quality of Service) are known. For example, as a QoS technique of guaranteeing parameters such as a designated bandwidth and delay time, HCCA (HCF Controlled Channel Access) which is an extended scheme of a conventional polling sequence of IEEE802.11 is available. According to HCCA, scheduling is performed in a polling sequence in consideration of required quality so as to guarantee parameters such as a bandwidth and delay time. Jpn. Pat. Appln. KOKAI Publication No. 2002-314546 refers to QoS in the IEEE802.11e standard, and discloses a method of assigning priorities to communications between communication apparatuses in a wireless network.

When the same frequency band as that in the existing specifications is to be used in increasing the communication speed, it is preferable to assure coexistence with communication apparatuses conforming to the existing specifications and to maintain backward compatibility. For this reason, it is basically preferable that a protocol on a MAC layer conforms to CSMA/CA matching the existing specifications. In this case, a temporal parameter associated with CSMA/CA, e.g., an IFS (InterFrame Space) or random backoff period needs to match that in the existing specifications.

Even if an attempt to increase the communication speed in terms of physical layer succeeds, the effective throughput of communication cannot be improved. That is, when the communication speed of the physical layer is increased, the format of a PHY frame (PHY header and PHY preamble) ceases to be effective any more. An increase in overhead due to this may hinder an increase in throughput. In a PHY frame, a temporal parameter associated with CSMA/CA is permanently attached to a MAC frame. In addition, a PHY frame header is required for each MAC frame.

As a method of reducing overhead and increasing throughput, a Block Ack technique introduced in recently drafted IEEE802.11e Draft 5.0 (enhancement of QoS in IEEE802.11) is available. The Block Ack technique can consecutively transmit a plurality of MAC frames without any random backoff, and hence can reduce the backoff amount to some degree. However, a physical layer header cannot be effectively reduced. In addition, according to aggregation introduced in initially drafted IEEE802.11e, both the backoff amount and the physical layer header can be reduced. However, since the length of a physical layer frame containing MAC frames cannot be increased beyond about 4 Kbytes under the conventional limitation on the physical layer, an improvement in efficiency is greatly limited. Even if the length of a PHY layer frame can be increased, another problem arises, i.e., the error tolerance decreases.

BRIEF SUMMARY OF THE INVENTION

The present invention has been made to solve the above problems, and has as its object to provide a communication apparatus and communication method which can coexist with an existing apparatus and can improve the substantial communication throughput by eliminating overhead accompanying the transmission of a plurality of frames by making a frame format more efficient.

A communication apparatus according to an aspect of the present invention comprises a receiving device configured to receive one physical frame in which a plurality of MAC frames are aggregated. This physical frame includes one acknowledgement request frame for the plurality of MAC frames. The apparatus includes an acknowledgement frame forming device configured to form an acknowledgement frame representing reception statuses of the plurality of MAC frames in response to the acknowledgement request frame. The apparatus also includes a transmitting device configured to transmit the acknowledgement frame. This acknowledgement frame includes a compressed acknowledgement frame representing an acknowledgement bitmap having a size equal to a maximum number of MSDUs (MAC Service Data Units) when one MPDU (MAC Protocol Data Unit) corresponds to one MSDU.

BRIEF DESCRIPTION OF THE SEVERAL VIEWS OF THE DRAWING

FIG. 1 is a block diagram showing the arrangement of a communication apparatus according to the first embodiment of the present invention;

FIG. 2 is a view showing the frame format of a Block Ack Request defined in IEEE802.11e Draft 8.0;

DETAILED DESCRIPTION OF THE INVENTION

First Embodiment

Figure 3:
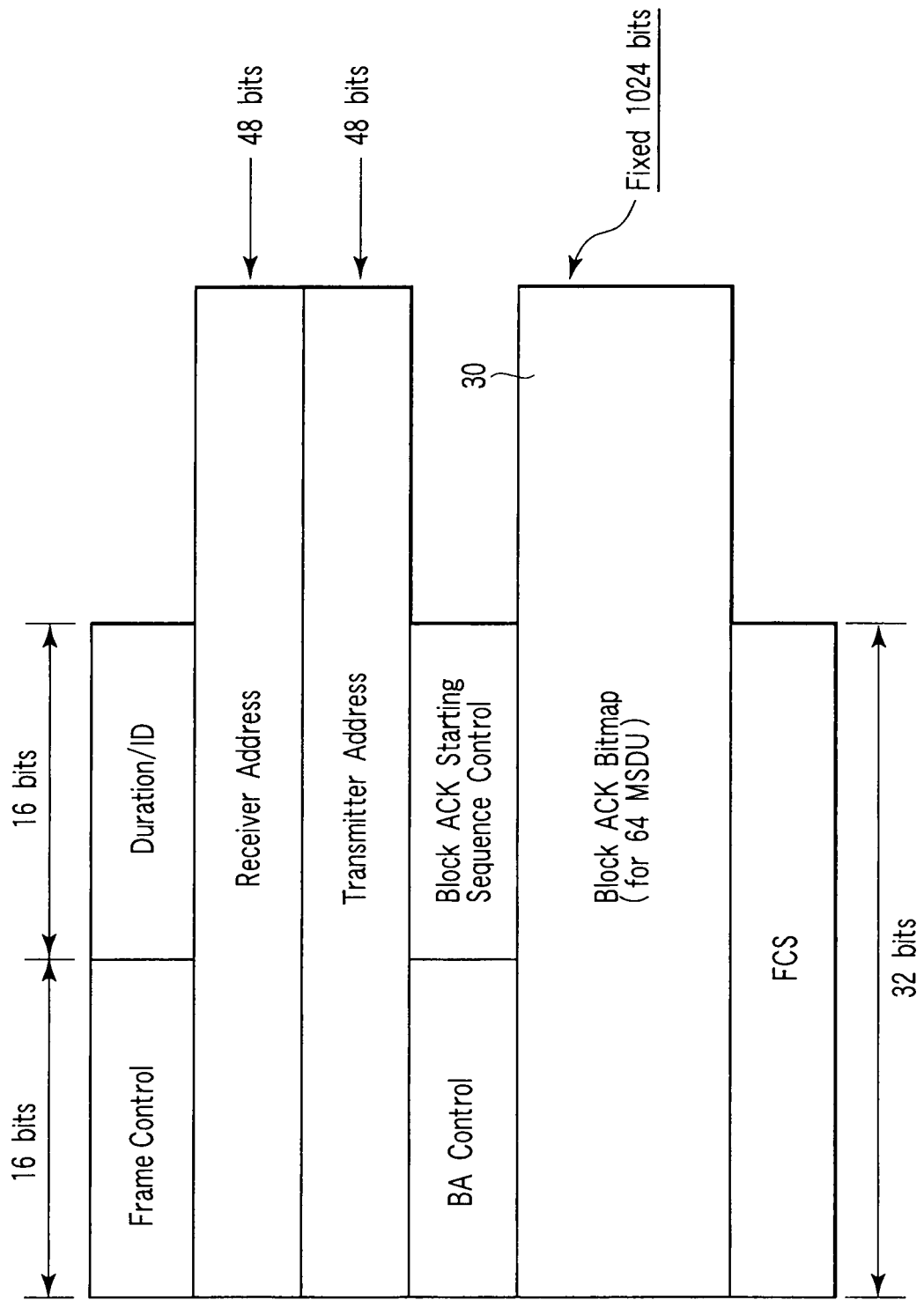
FIG. 3 is a view showing the frame format of a Block Ack defined in IEEE802.11e Draft 8.0.

FIG. 1 is a block diagram showing the arrangement of a communication apparatus according to the first embodiment of the present invention. A communication apparatus 100 is an apparatus configured to communicate with another communication apparatus through a wireless link, and includes processing units 101, 102, and 103 respectively corresponding to a physical layer, MAC layer, and link layer. These processing units are implemented as analog or digital electronic circuits in accordance with implementation requirements. Alternatively, the processing units are implemented as firmware or the like to be executed by a CPU incorporated in an LSI. An antenna 104 is connected to the physical layer processing unit ("processing unit" will be omitted hereinafter) 101. The MAC layer 102 includes an aggregation processing device 105 for MAC frames. The aggregation processing device 105 includes a carrier sense control device 106 and retransmission control device 107 which performs transmission/reception of Block Ack (acknowledgement for a plurality of MAC frames) frames (to be described in detail later) and Block Ack Request (requirement for acknowledgement) frames (to be described in detail later), retransmission control based on Block Ack and Block Ack Request frames, and the like.

The physical layer 101 is designed to be compatible with two types of physical layer protocols. The processing unit 101 includes a first-type physical layer protocol processing device 109 and a second-type physical layer protocol processing device 110 for the respective types of protocol processing. The first-type physical layer protocol processing device 109 and second-type physical layer protocol processing device 110 often share circuits and are not necessarily independent of each other in terms of implementation.

In this embodiment of the present invention, the first-type physical layer protocol is assumed to be a protocol defined in IEEE802.11a, and the second-type physical layer protocol is assumed to be a protocol using a so-called MIMO (Multiple Input Multiple Output) technique using a plurality of antennas on each of the transmitting side and the receiving side. Using the MIMO technique makes it possible to expect an increase in transmission capacity almost proportional to the number of antennas without changing the frequency band. The MIMO technique is therefore a technique directed to further increase the throughput of IEEE802.11. Note that the link layer 103 has a normal link layer function defined in IEEE802. The technique to be used to increase the transmission rate is not limited to MIMO. For example, a method of increasing the occupied frequency band may be used or may be combined with MIMO.

According to IEEE802.11e Draft 8.0, as a technique of improving the transmission efficiency of the MAC (Media Access Control) layer, a Block Ack (Block acknowledgement) technique has been proposed. In the Block Ack technique, a given terminal transmits QoS (Quality of Service) data at minimum frame intervals called SIFS (Short Inter-Frame Space) for a given channel use period (TXOP: Transmission opportunity). Thereafter, the terminal transmits a Block Ack Request to the receiving terminal at an arbitrary timing to request its reception status. The receiving side converts the reception status into information in the bitmap format on the basis of the Starting Sequence Number determined by the value of Block Ack Starting Sequence Control of the Block Ack Request, and returns the information as a Block Ack.

FIGS. 2 and 3 respectively show the formats of a Block Ack Request frame and Block Ack frame which are defined in IEEE802.11e Draft 8.0. A Frame Control field, Duration/ID field, Receiver Address (destination address) field, and Transmitter Address (transmission source address) field shown in FIGS. 2 and 3 form the MAC header defined in IEEE802.11. A BAR Control (Block Ack Request Control) field has a 4-bit TID (Traffic Identifier: priority identifier) field. QoS data exists for each priority (TID) and is assigned a unique sequence number and fragment number. For this reason, a reception status in the Block Ack also needs to be prepared for each priority. The TID field of BAR Control in the Block Ack Request is used to designate this priority. Block Ack Starting Sequence Control (starting point sequence control) in the Block Ack Request in FIG. 2 is comprised of a 4-bit fragment number field and 12-bit Starting Sequence Number (start point sequence number) field. Starting sequence number is used by a receiving terminal to generate a Block Ack by tracing back a reception status, on the basis of a relative reception status from a sequence number corresponding to Starting Sequence Number. Like BAR Control in FIG. 2, BA Control in the Block Ack in FIG. 3 contains a 4-bit TID field. Block Ack Starting Sequence Control (starting point sequence control) indicates the starting point sequence number of the reception status indicated by a Block Ack Bitmap 30 in the Block Ack. According to IEEE802.11e Draft 8.0, the size of the Block Ack Bitmap 30 is a fixed length of 1,024 bits, which makes it possible to notify a reception status corresponding to data of a maximum of 64 MSDUs (Mac Service Data Units). The Block Ack procedure of IEEE802.11e takes fragmentation of MAC frame into consideration. The fragmentation is a process of partitioning a MSDU or MMPDU (MAC Management Protocol Data Unit) into smaller MAC level frames, MPDUs (MAC Protocol Data Units). One MSDU can be fragmented into maximum of 16 MPDUs. Note that an FCS (Frame Check Sequence) for error detection is added to each of the MAC frames shown in FIGS. 2 and 3. 1024 is a value obtained by multiplying the maximum number of MSDUs ("64" in IEEE802.11e) which can be continuously transmitted while using a Block Ack period by the maximum number of fragment frames per MSDU ("16" in IEEE802.11). Therefore, the Block Ack Bitmap 30 has a size of 1,024 bits in order to notify a reception status of a maximum of 1,024 MPDUs.

Figure 4:
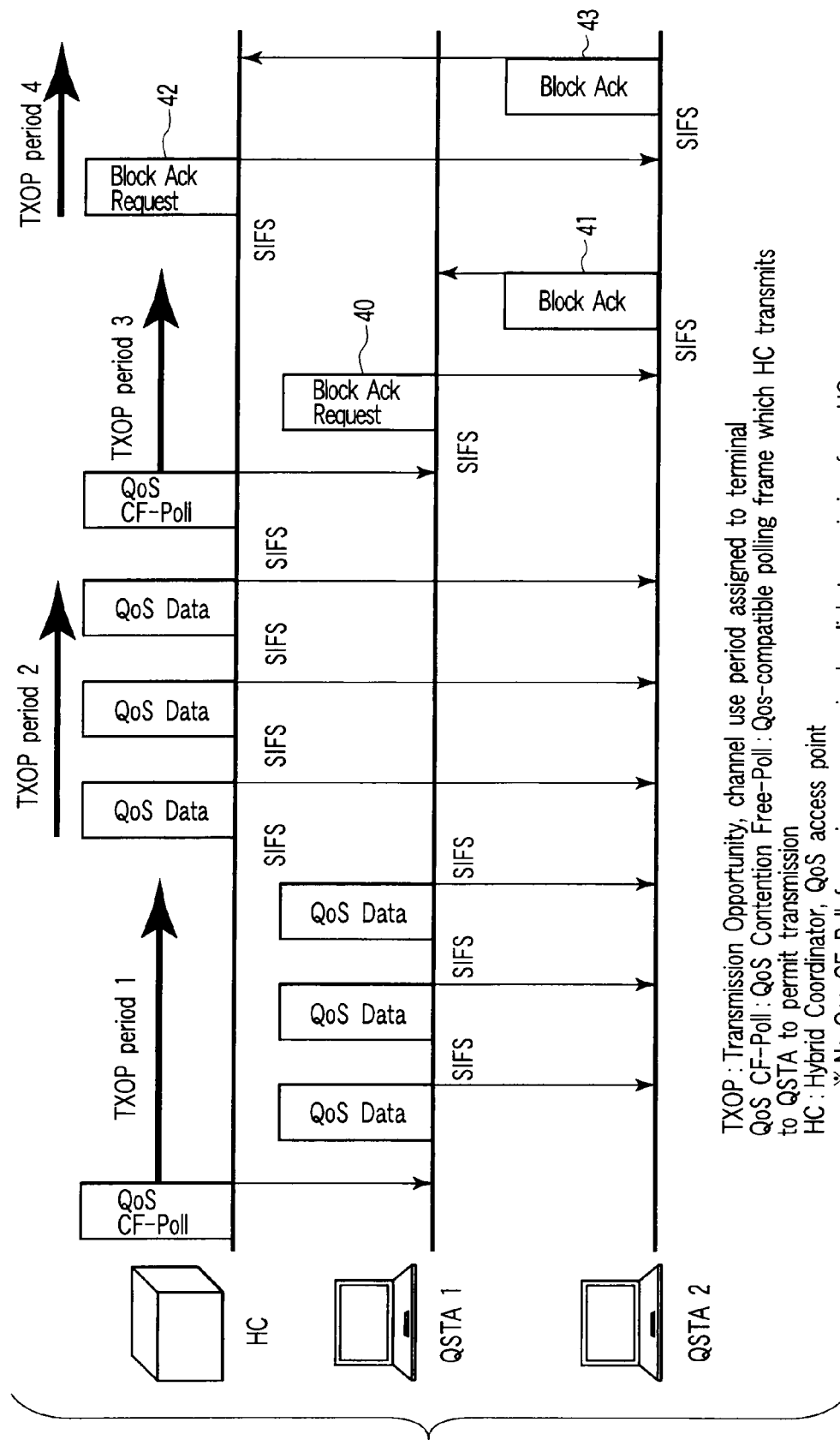
FIG. 4 is a view showing an (immediate) Block Ack sequence.
Figure 5:
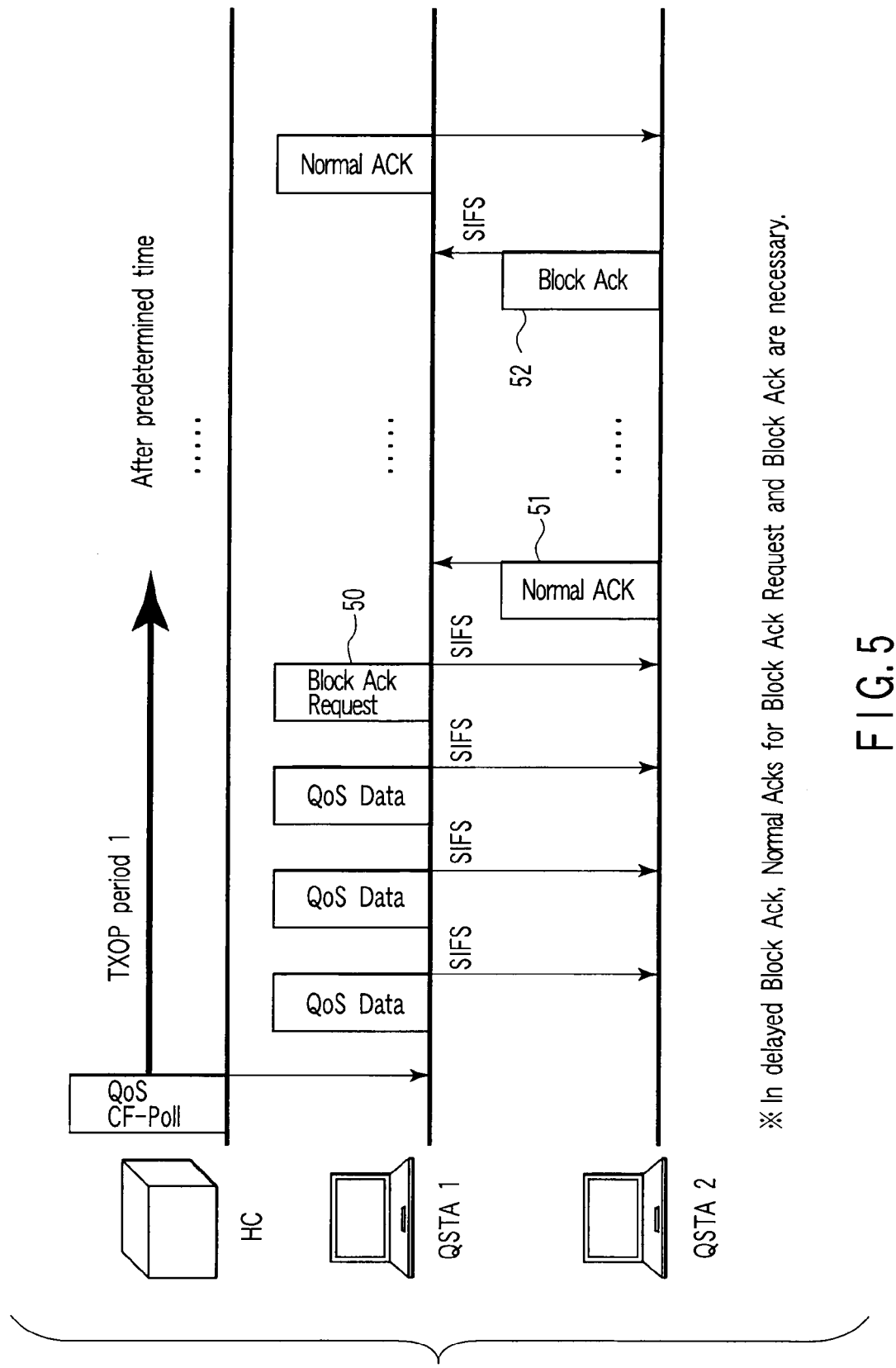
FIG. 5 is a view showing a (delayed) Block Ack sequence.

FIGS. 4 and 5 each show an example of a Block Ack transmission sequence in HCCA (Hybrid coordination function Controlled Channel Access). An HC (Hybrid Coordinator) shown in each drawing is a QoS access point (QoS-AP) in IEEE802.11e Draft 8.0 and serves as an entity which performs bandwidth management including the allocation of TXOPs to a QoS terminal (QSTA: QoS Station), and performs downlink (the downlink direction from the HC to the QSTA) transmission. The assignment of a TXOP to the QSTA is performed on the basis of a QoS CF-Poll frame (QoS Contention Free-Poll: a QoS-compatible polling frame which is transmitted from the HC to the QSTA to permit transmission). Referring to FIG. 4, first of all, the HC assigns a channel use period (TXOP 1) to QSTA 1 by transmitting a QoS CF-Poll frame to it. A QSTA can transmit any frame in its TXOP. In the example shown in FIG. 4, QSTA 1 transmits QoS data at SIFS intervals to QSTA 2. When the TXOP period of QSTA 1 expires, the HC transmits QoS data to QSTA 1 in a burst manner (TXOP 2). When the channel period of the HC expires, the HC assigns a channel use period (TXOP 3) to QSTA 1 again. QSTA 1 transmits a Block Ack Request to QSTA 2, thereby requesting the destination to transmit a relative reception status designated by Block Ack Starting Sequence Control. FIG. 4 shows an example of Immediate Block Ack. In this case, the terminal which has received the Block Ack Request must return a Block Ack after a SIFS period. More specifically, QSTA 2 must return a Block Ack 41 after a SIFS period to a Block Ack Request 40 from QSTA 1. Also, in TXOP 4, QSTA 2 must return a Block Ack 43 after a SIFS period to a Block Ack Request 42 from the HC.

FIG. 5 shows an example of Delayed Block Ack. Upon receiving a Block Ack Request, the terminal returns a Normal defined in IEEE802.11, and transmits a Block Ack after a lapse of an arbitrary period. More specifically, QSTA 2 having received a Block Ack Request 50 from QSTA 1 first returns a Normal 51 defined in IEEE 802.11, and then returns a Block Ack 52 after a lapse of an arbitrary period. When a data transmitting terminal having received the last Block Ack returns a Normal, a series of sequences of the Delayed Block Ack are complete. Note that the receiving side is notified of QoS data as an object of Block Ack by using an Ack policy field in a QoS control field extended for IEEE802.11e Draft 8.0.

Figure 6:
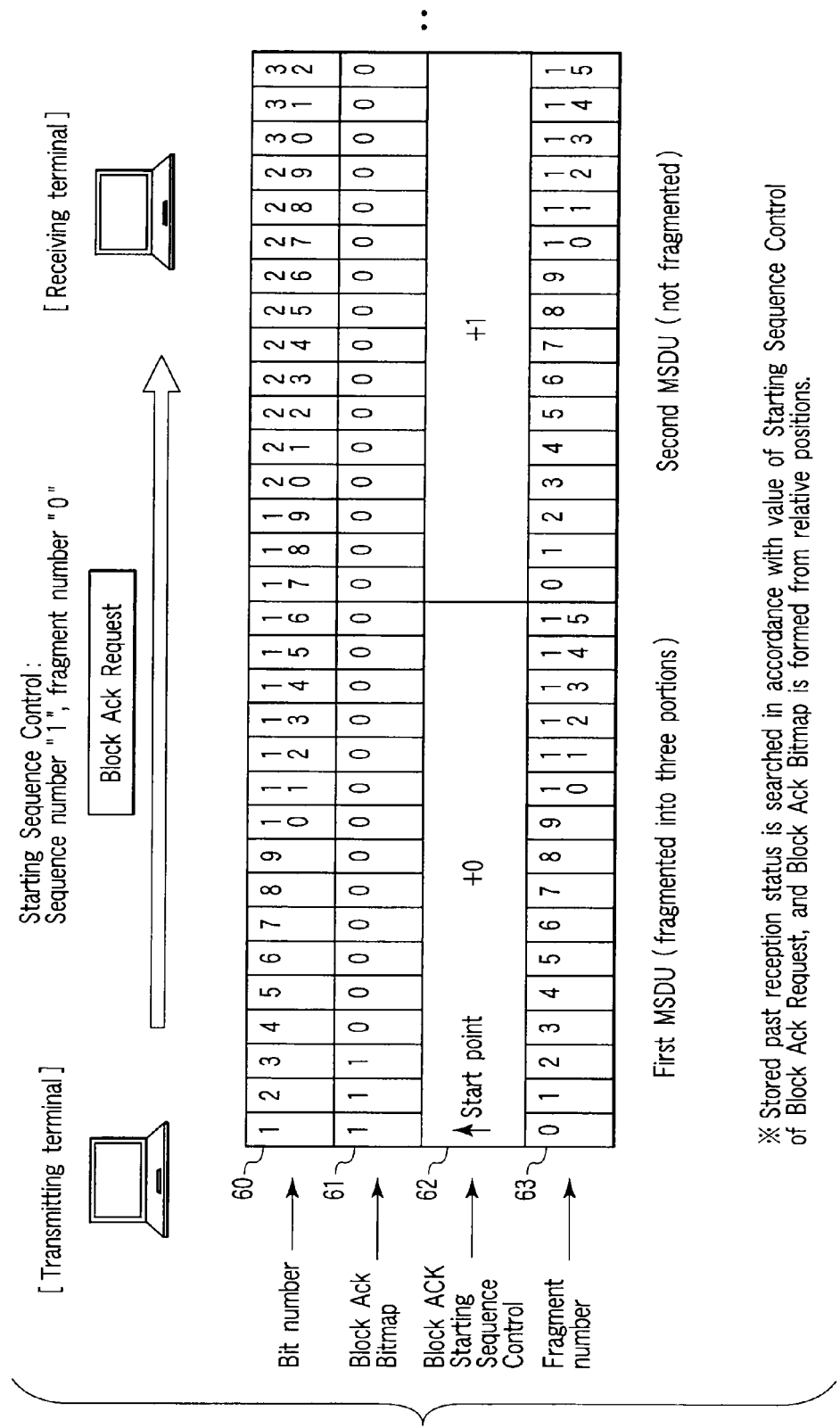
FIG. 6 is a view for explaining a conventional Block Ack formation procedure.
Figure 7:
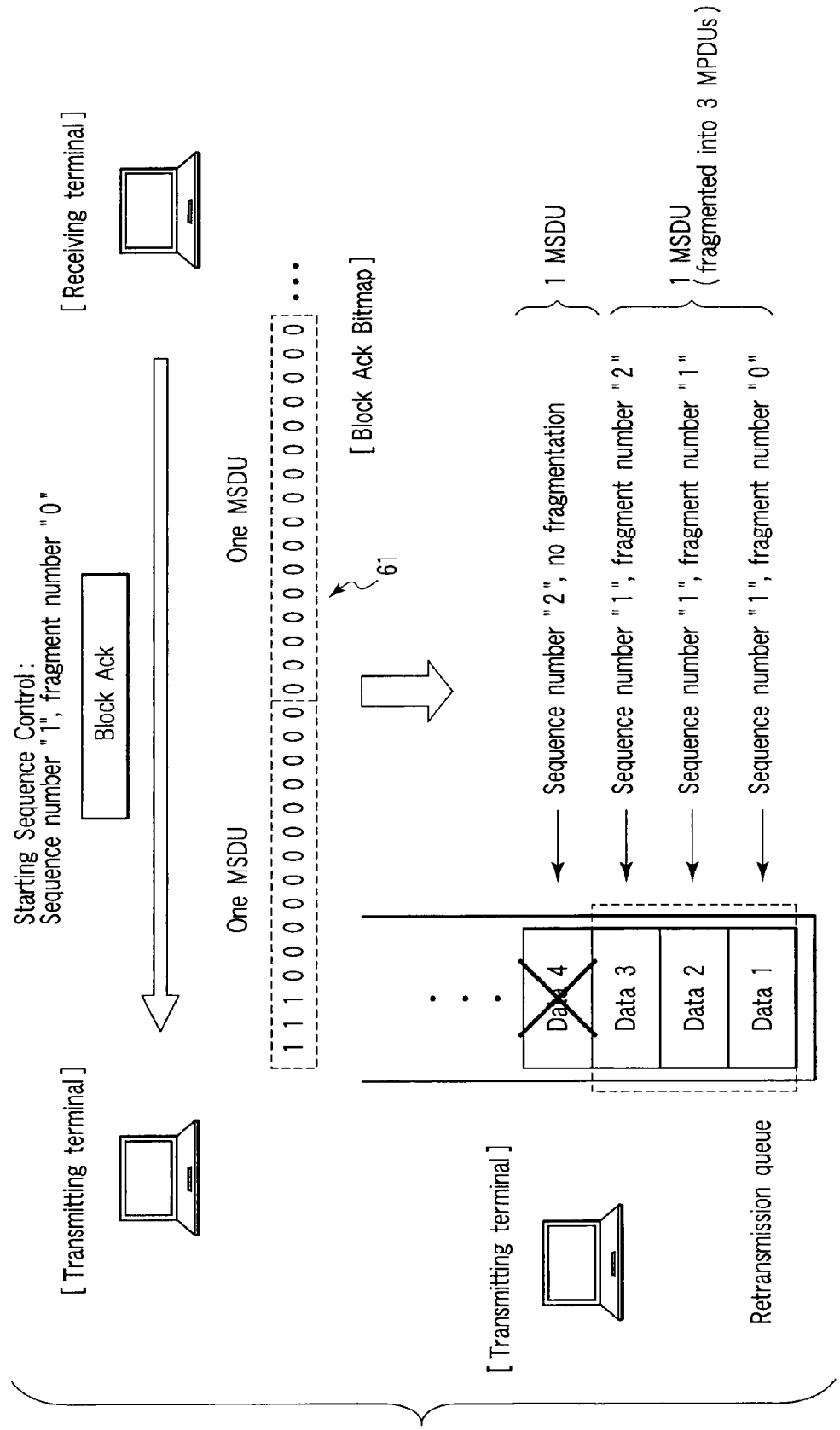
FIG. 7 is a view for explaining the conventional Block Ack formation procedure.

A procedure necessary to form a Block Ack will be explained below with reference to FIGS. 6 and 7. Referring to FIG. 6, a transmitting terminal transmits QoS data in a burst manner, and then transmits a Block Ack Request which designates arbitrary Block Ack Starting Sequence Control (in the example shown in FIG. 6, the sequence number is "1", and the fragment number is "0"). A receiving terminal in which a reception status is stored for each transmission source address and each priority (TID) tracks back to a frame corresponding to Block Ack Starting Sequence Control and, from this frame, forms a relative reception status as a Block Ack Bitmap having 1,024 bits (for 64 MSDU with fragmentation in mind). The example shown in FIGS. 6 and 7 assumes that the transmitting side has transmitted an MSDU (fragmented into three portions) having sequence number "1", an MSDU (not fragmented) having sequence number "2", and the like (total 4 MPDUs). Bit number 60 shown in FIG. 6 indicates a relative position from the start position of a Block Ack Bitmap. A Block Ack Bitmap 61 in FIG. 6 shows that the MSDU (fragment numbers 63 are "0", "1", and "2") having the sequence number "1" is successfully received, but the MSDU (not fragmented) having the sequence number "2" is not received due to an error or the like. Block Ack Starting Sequence Control 62 of the Block Ack copies the value designated by the Block Ack Request, and transmits the copy. A transmitting terminal shown in FIG. 7 determines frames to be retransmitted on the basis of Block Ack Starting Sequence Control of a Block Ack and the contents of a Block Ack Bitmap. In this example shown in FIGS. 6 and 7, the sequence number "2" (not fragmented) is an error frame, so the corresponding portion of the Block Ack Bitmap 61 is "0". As a consequence, the transmitting terminal determines that the MSDU (not fragmented) having the sequence number "2" must be retransmitted.

As described above, in the Block Ack determined in IEEE 802.11e Draft 8.0, the QoS data receiving side must perform many processes. For this reason, it is presumably generally difficult to implement Immediate Block Ack mechanism by which a Block Ack is returned when an SIFS period has elapsed after a Block Ack Request is received. (The receiving side receives Block Ack Request frame, performs error check with FCS, checks the starting sequence number and searches the past reception status from storage area, and creates the Block Ack Bitmap for Block Ack frame and transmits it.)

The embodiment of the present invention, therefore, proposes a method of solving this problem. In the first embodiment of the present invention, when a PSDU in which a plurality of MPDUs are aggregated and a Block Ack Request is aggregated at the end of these MPDUs is received, a reception status of the aggregated MPDUs is reflectively returned as an Immediate Block Ack.

According to the definition of IEEE802.11, fragmentation (partitioning) is performed if the size of a frame is larger than a predetermined threshold value. Fragment numbers are assigned to fragmented MPDUs. A fragment number in the MAC header is a value representing the relative position of an MPDU in an MSDU. Fragment numbers normally take consecutive values starting from 0. A receiving terminal reassembles the original MSDU on the basis of these fragment numbers and sequence numbers.

Figure 8:
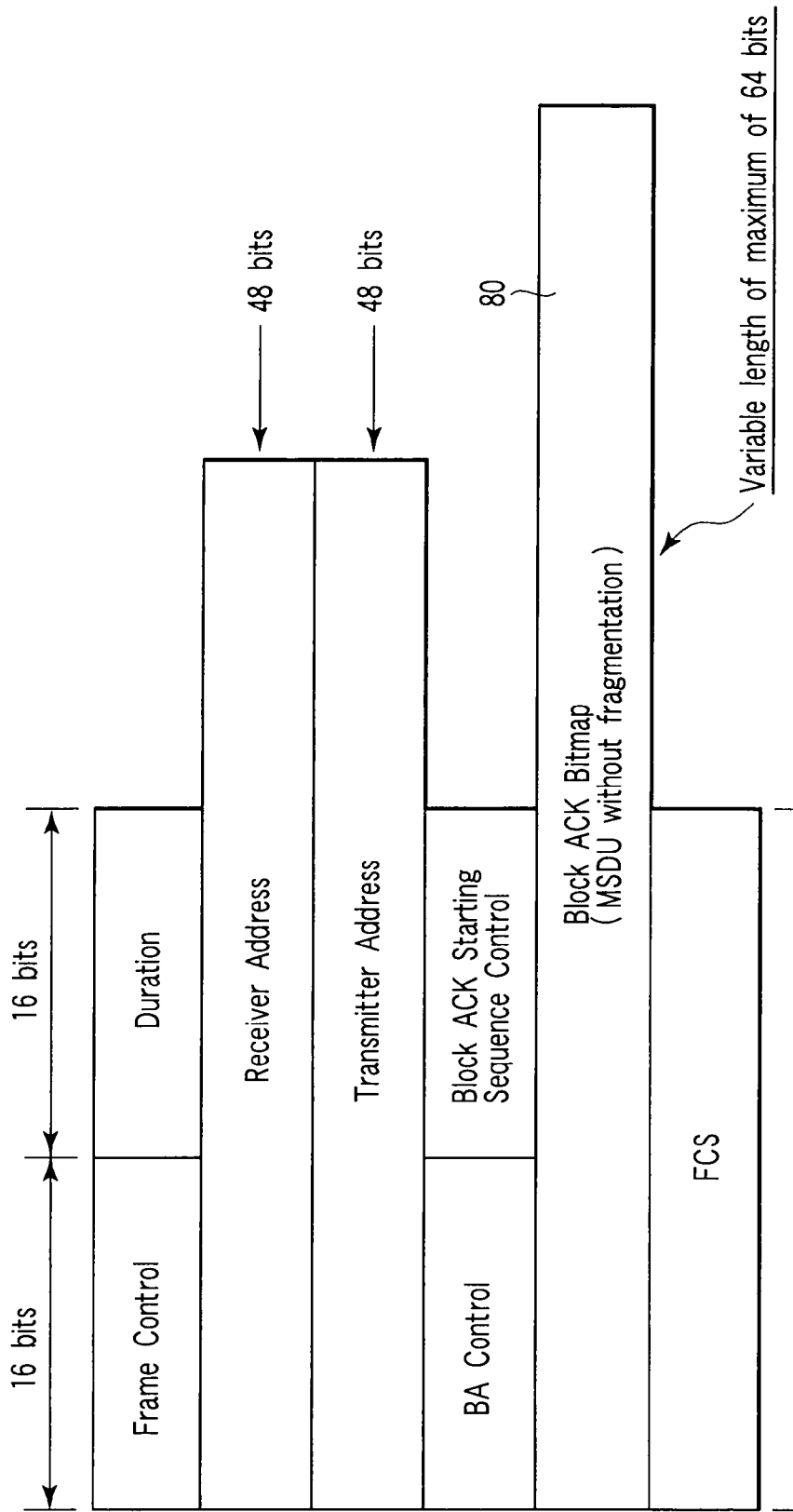
FIG. 8 is a view showing the format of a Compressed Block Ack.

In the MAC transmission procedures of IEEE 802.11 and IEEE 802.11e Draft 8.0, fragmented MPDUs are generally transmitted at SIFS intervals, so overhead corresponding to the frame interval (SIFS) is produced, and this decreases the transmission efficiency. To realize high throughput, therefore, no fragmentation is desirably performed. Originally, the fragmentation mechanism is installed in an environment that long physical frame tends to be error-prone. But the aggregation method that omits IFS and PHY header (and PHY preamble) to reduce the overhead assume that a long physical frame is transmitted normally. In such a case, no fragmentation is desirably performed. Although the fragmented MPDUs can be aggregated into one physical frame, the overhead of MAC headers still remain. As shown in FIG. 8, in this embodiment which performs no fragmentation, the number of bits of a Block Ack Bitmap 80 can be compressed to a maximum of 64 MPDUs. That is, the size of the Block Ack Bitmap 80 is equivalent to the maximum number of MSDUs when one MPDU corresponds to one MSDU, and can be compressed to 64 bits, i.e., 1/16 the conventional size.

A Block Ack frame as shown in FIG. 8 will be referred to as a "Compressed Block Ack (compressed acknowledgement)" hereinafter. When Block Ack transmission is to be performed between transmitting and receiving terminals by using a Compressed Block Ack, negotiation may also be performed beforehand. As a practical negotiation method, it is possible to extend, e.g., the Block Ack setting procedure described in IEEE 802.11e Draft 8.0. That is, the use of a Compressed Block Ack is requested by an ADDBA (add block ack) request, and the use of a Compressed Block Ack is permitted or rejected by an ADDBA response. When frames of data, a Block Ack Request, and a Compressed Block Ack as objects of this setting are to be exchanged, it is possible to impose the limitation that all these components must respond by Compressed Block Ack, or to permit them to respond by mixing a normal Block Ack and Compressed Block Ack. It is also possible to add information for requesting or permitting Compressed Block Ack, rather than normal Block Ack, to a Block Ack Request. The method of requesting or permitting Compressed Block Ack by using a Block Ack Request can be applied regardless of whether there is a preceding Block Ack setting procedure.

Figure 9:
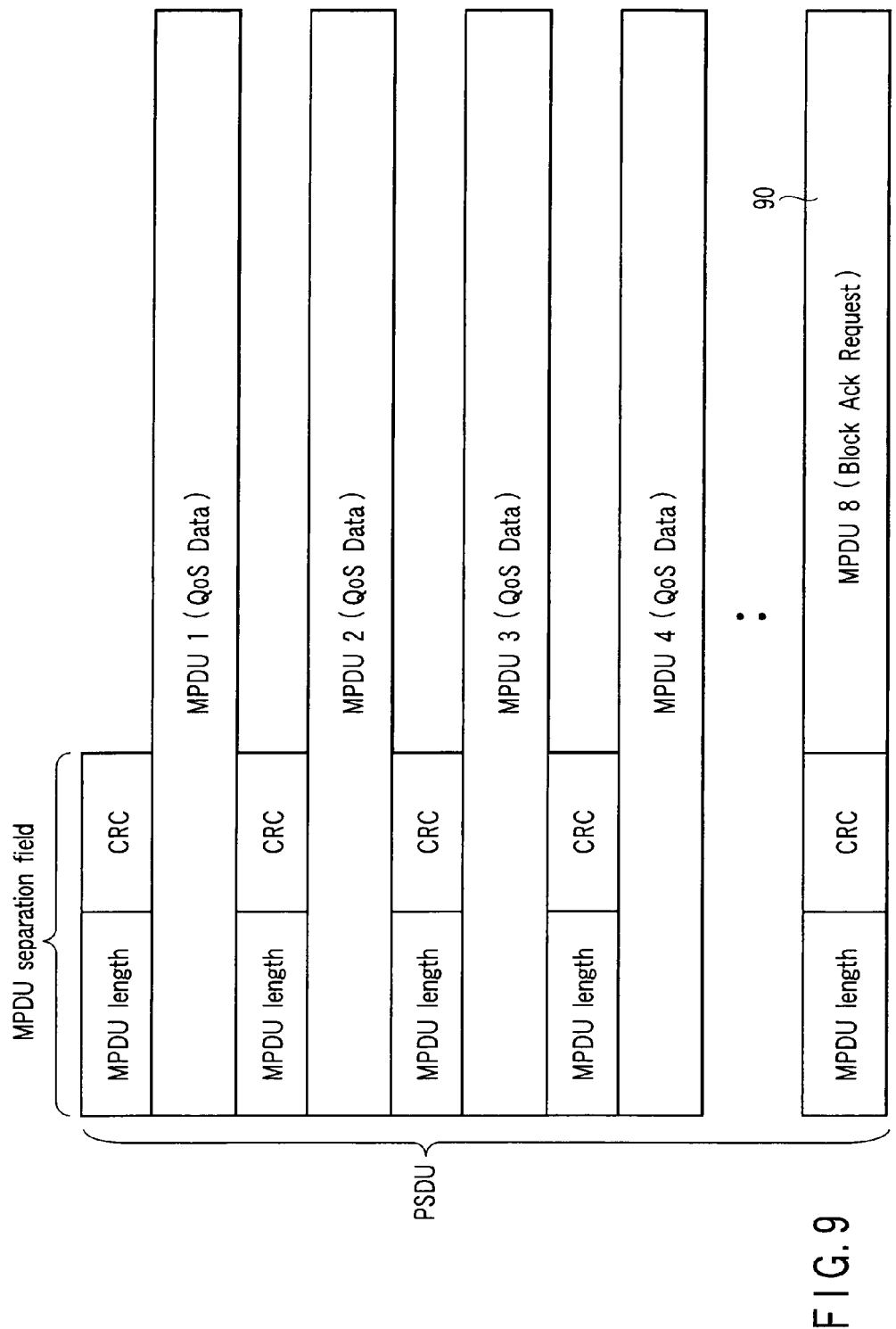
FIG. 9 is a view showing an example of a format which aggregates a plurality of MPDUs.
Figure 10:
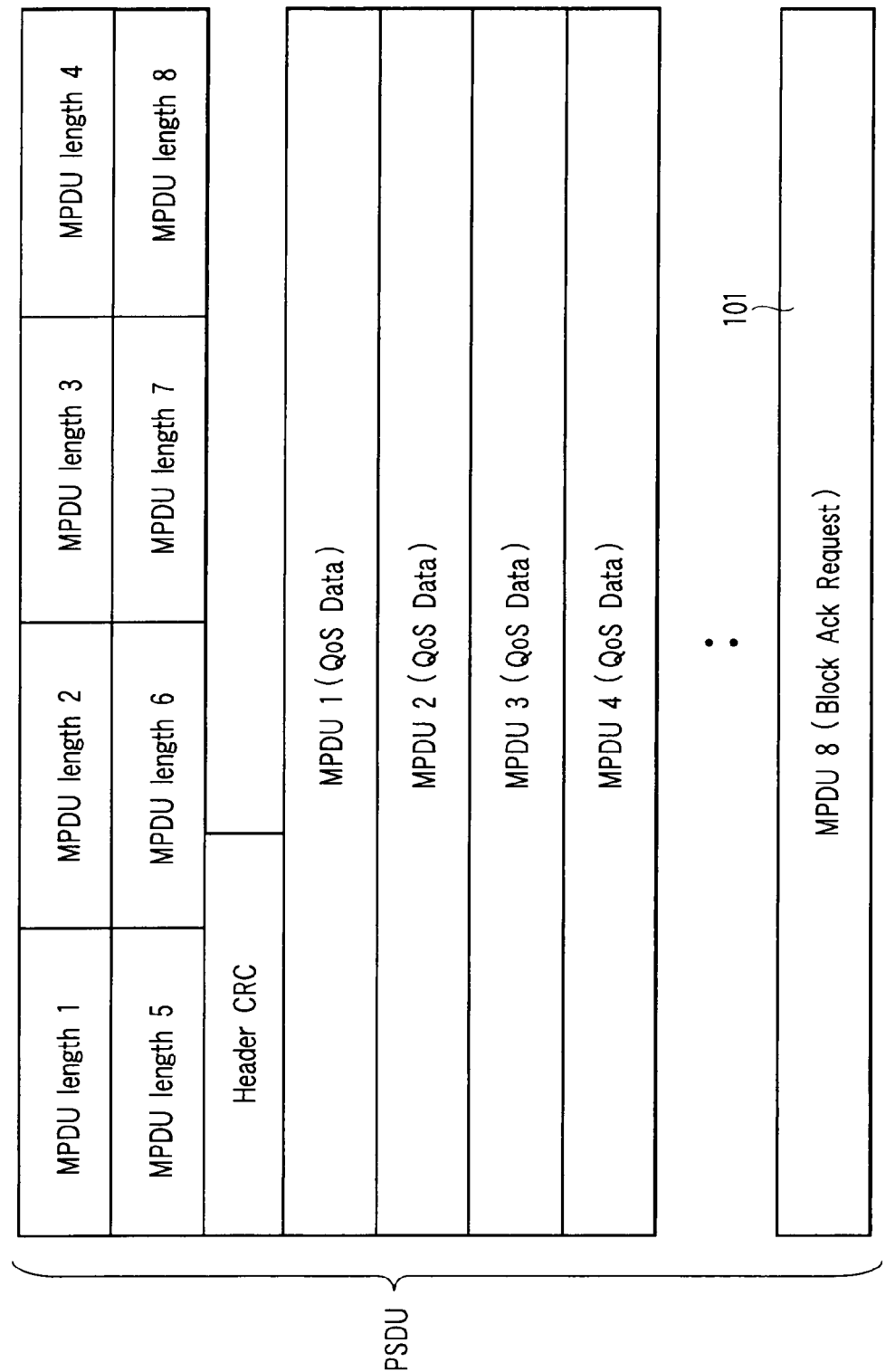
FIG. 10 is a view showing another example of the format which aggregates a plurality of MPDUs.

Also, to realize high throughput at the MAC layer, it is possible to transmit individual MPDUs at once by aggregating them into one PSDU. FIGS. 9 and 10 each show an example of aggregation of a plurality of MPDUs. In the example shown in FIG. 9, the head of each MPDU in a PSDU contains a field indicating the length of the MPDU and CRC (Cyclic Redundancy Check) for the length information of the MPDU. The length information and CRC of an MPDU will be collectively referred to as an "MPDU separation field" hereinafter. Note that this MPDU separation field may also contain, e.g., another additional information, a preservation region, and a byte alignment region (for, e.g., 4-byte alignment). A terminal having received this PSDU shown in FIG. 9 checks MPDU separation fields from the first one, and, if an MPDU separation field is not an error, cuts out the subsequent MPDU, and calculates an FCS (Frame Check Sequence) of the MPDU. If an MPDU separation field is an error, the length of the subsequent MPDU is unknown. Therefore, the terminal continuously calculates (scans) CRCs of MPDU separation fields in appropriate byte units. For an MPDU separation field having a correct CRC calculation result, the terminal calculates an FCS of the subsequent MPDU to check whether this MPDU is successfully received.

On the other hand, in the aggregation example shown in FIG. 10, the head of a PSDU contains length information of a plurality of MPDUs as a header, and CRC is added to a plurality of pieces of length information. This header will be referred to as a "MAC super frame header" hereinafter. A terminal having received this PSDU shown in FIG. 10 calculates CRC of the MAC super frame header, and, if the calculation result is an error, determines that all the MPDUs are errors. If the MAC super frame header is successfully received, the terminal calculates FCS for each of the aggregated MPDUs to check whether the MPDU is successfully received.

In the examples shown in FIGS. 9 and 10, Block Ack Request frames 90 and 101 are aggregated to the ends of the PSDUs in each of which a plurality of MPDUs are aggregated. Note that in these examples shown in FIGS. 9 and 10, the maximum number of MPDUs which can be aggregated is eight. However, this number is of course not limited to eight and can take any arbitrary value. The maximum number of MPDUs which can be aggregated must be predetermined or set by negotiation or the like between transmitting and receiving terminals. However, details of a practical negotiation method will not be explained.

Figure 11:
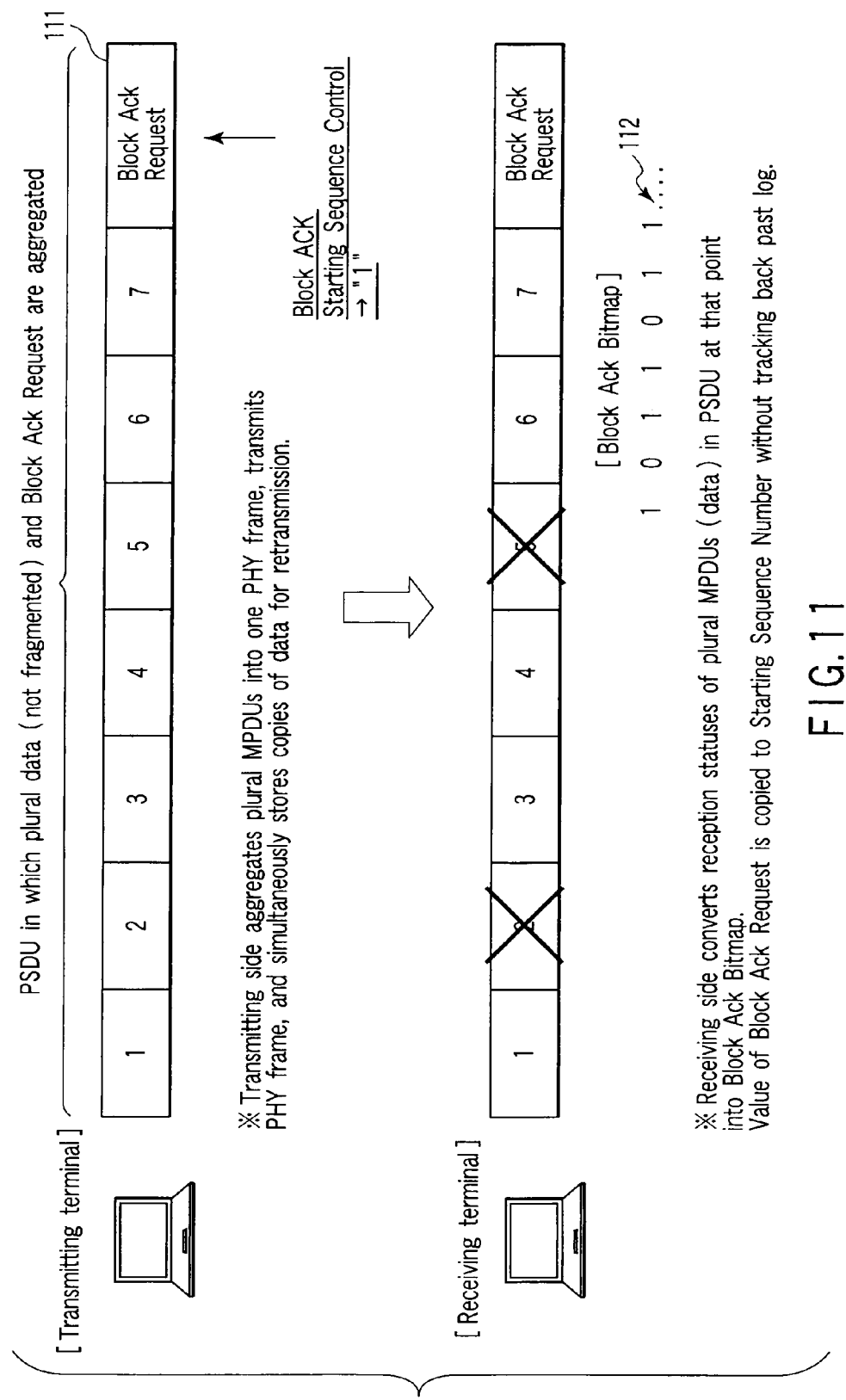
FIG. 11 is a view for explaining a Compressed Block Ack Response according to the first embodiment.
Figure 12:
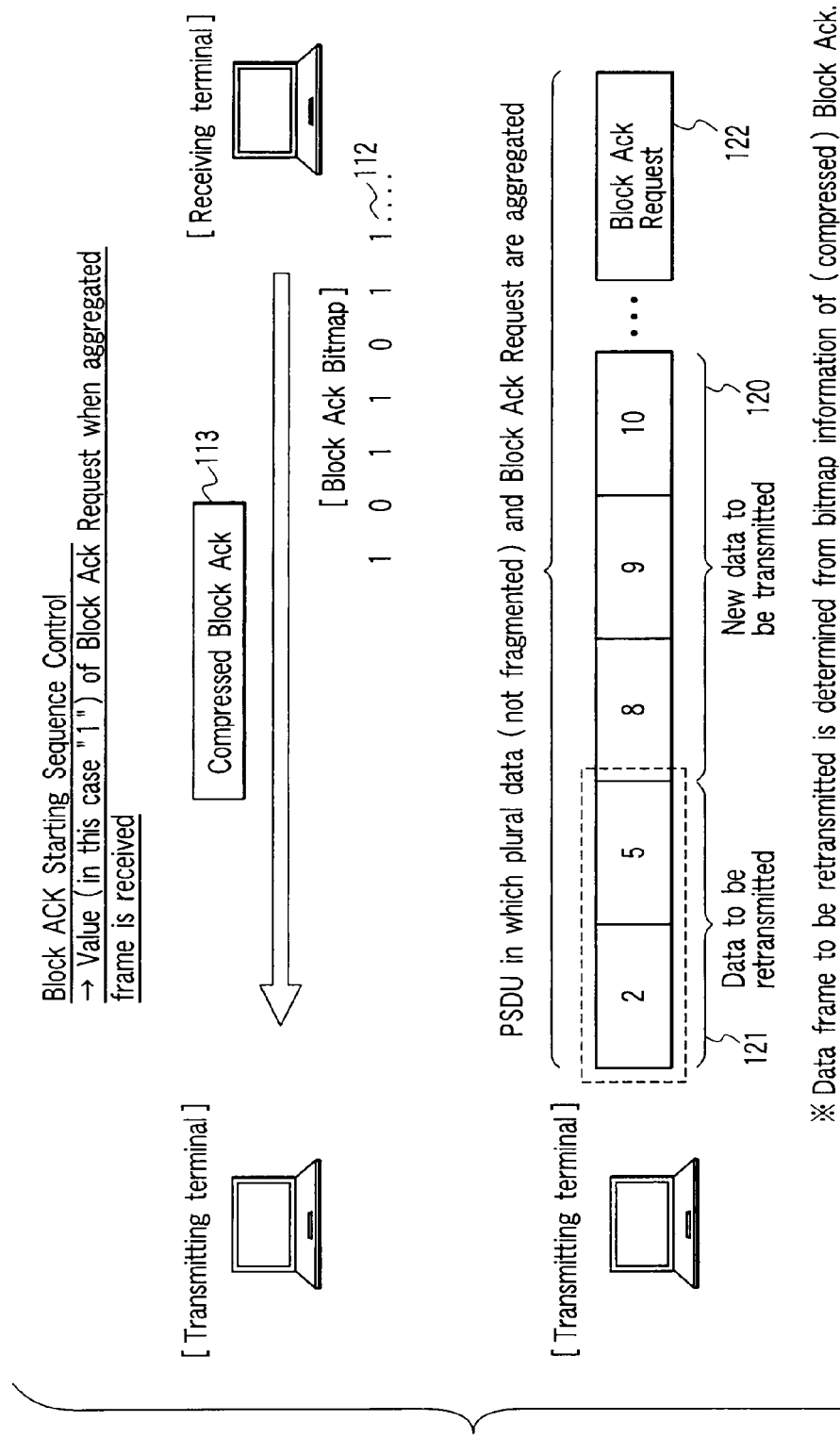
FIG. 12 is a view for explaining the Compressed Block Ack Response according to the first embodiment.

The basic concept according to the embodiment of the present invention will be described below with reference to FIGS. 11 to 13. Assume that a transmitting terminal transmits MPDUs having consecutively assigned sequence numbers "1" to "7". The transmitting terminal aggregates a plurality of MPDUs (QoS data frames) into one PSDU by the method shown in FIG. 9 or 10, and aggregates a Block Ack Request defined IEEE802.11e 111 for these MPDUs to the end of the PSDU. The value of Block Ack Starting Sequence Control of the Block Ack Request 111 is the same as a sequence number described in the MAC header of the first MPDU aggregated in the PSDU. The transmitting terminal has a main queue which stores MAC frames addressed to various destinations and having various priorities, and a subqueue for retransmitting aggregated MPDUs. In the example shown in FIG. 11, copies of the MPDUs having the sequence numbers "1" to "7" are stored in the subqueue to prepare for retransmission. A terminal having received this PSDU in which these MPDUs are aggregated performs error calculations for the MPDUs by the above-mentioned method. In the example shown in FIG. 11, MPDUs having the sequence numbers "2" and "5" in the PSDU are found to be errors by FCS calculations. In this embodiment of the present invention, the PSDU receiving terminal forms reception statuses at that point as a Block Ack Bitmap 112. That is, in the example shown in FIG. 11, a bitmap 1011011 . . . in which "1" indicates successful reception and "0" indicates reception failure is formed. It is of course also possible to switch the positive logic and negative logic. If the last MPDU aggregated in the PSDU is successfully received, the data receiving terminal forms a Compressed Block Ack 113 as shown in FIG. 12 by using a Block Ack Bitmap 112 formed at that point, with respect to the data transmitting terminal.

If the number of the aggregated MPDUs is smaller than the maximum number of MPDUs which can be aggregated in one PSDU, padding is performed by placing 0 in the Block Ack Bitmap 112. Assuming that the maximum number of MPDUs which can be aggregated is 64 in the example shown in FIG. 11, a bit map indicated by 10110110000 . . . is formed. Alternatively in this embodiment, the receiving terminal can change the bitmap length of the Block Ack Bitmap 112 in accordance with the number of MPDUs aggregated in a PSDU. In this case, information indicating the bitmap length may also be added to the BA Control field of the Compressed Block Ack shown in FIG. 8. The value of the Block Ack Request 111 is copied as the value of Block Ack Starting Sequence Control of the Compressed Block Ack 113. Referring to FIG. 12, the data transmitting terminal having received the Block Ack compares the value indicated by Block Ack Starting Sequence Control of the Compressed Block Ack 113 with the sequence numbers of the MPDUs transmitted by the terminal. From the information of the Block Ack Bitmap 112, the data transmitting terminal detects successfully transmitted MPDUs, and determines MPDUs to be retransmitted. In the example shown in FIG. 12, the Block Ack Bitmap 112 contains 0s in portions corresponding to the sequence numbers "2" and "5". Therefore, the data transmitting terminal determines that these two frames are MPDUs to be retransmitted.

After thus determining the MPDUs to be retransmitted, the transmitting terminal extracts a new MAC frame 120 from the main queue, assigns sequence numbers to the extracted MAC frame 120, and aggregates it in a PSDU, as long as the buffer capacity of the receiving terminal permits. Successfully transmitted MPDUs in the subqueue can be continuously deleted from the first one of the queue. The number and the like of the newly added MPDUs 120 can be determined by using a technique called sliding window control. A Block Ack Request 122 for a plurality of MPDUs including MPDUs 121 to be retransmitted is aggregated to the end of a PSDU in which these MPDUs are aggregated.

Figure 13:
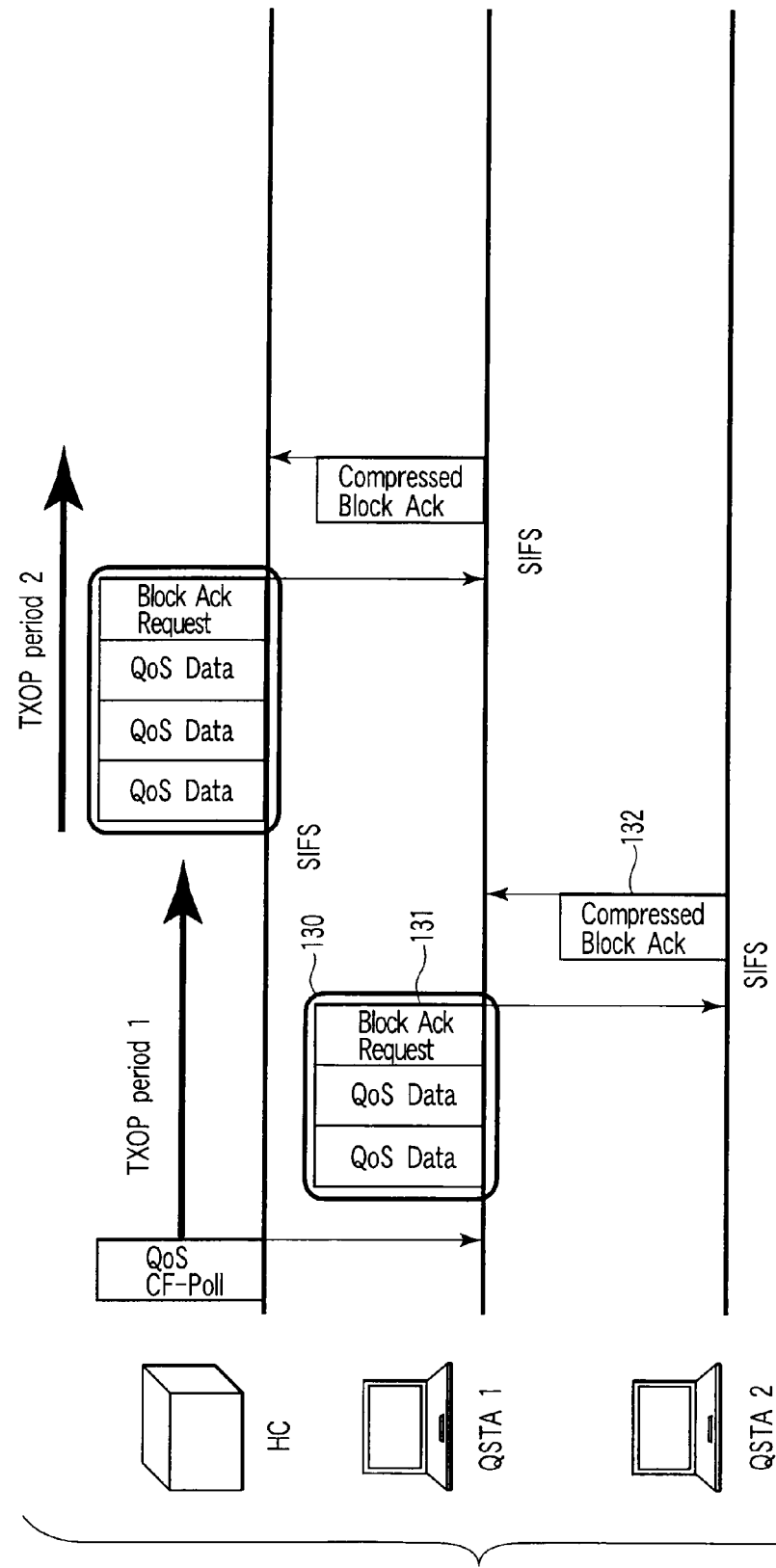
FIG. 13 is a view for explaining the Compressed Block Ack Response according to the first embodiment.

FIG. 13 shows a basic sequence example based on the above contents. Within a given TXOP period, a terminal aggregates a plurality of QoS data into one physical frame, and aggregates a Block Ack Request to the end of a PSDU, thereby urging the receiving side to transmit a Compressed Block Ack immediately. The data receiving side calculates reception statuses of a plurality of MPDUs except for the Block Ack Request in the PSDU, relates the obtained information directly to a Block Ack Bitmap, and returns a Compressed Block Ack. More specifically, in TXOP period 1, for example, QSTA 1 aggregates a plurality of QoS data into one PSDU 130, and aggregates a Block Ack Request 131 to the end of the PSDU 130, thereby urging the receiving side to transmit a Compressed Block Ack immediately. QSTA 2 is the data receiving side calculates reception statuses of a plurality of MPDUs except for the Block Ack Request 131 in the PSDU 130, relates the obtained information directly to a Block Ack Bitmap, and returns a Compressed Block Ack 132.

Unlike in the conventional scheme (Block acknowledgement procedure defined in IEEE802.11e), no past reception status is searched on the basis of Block Ack Starting Sequence Control of a Block Ack Request frame. This makes it possible to reduce the search process having a relatively large load, and to facilitate returning a partial response within a SIFS as a limited period. Also, the search time and the circuit scale generally have a tradeoff relationship. Therefore, the circuit scale can be reduced for the same allowable maximum processing delay.

Examples of retransmission control when reception errors occur will be explained below.

Figure 14:
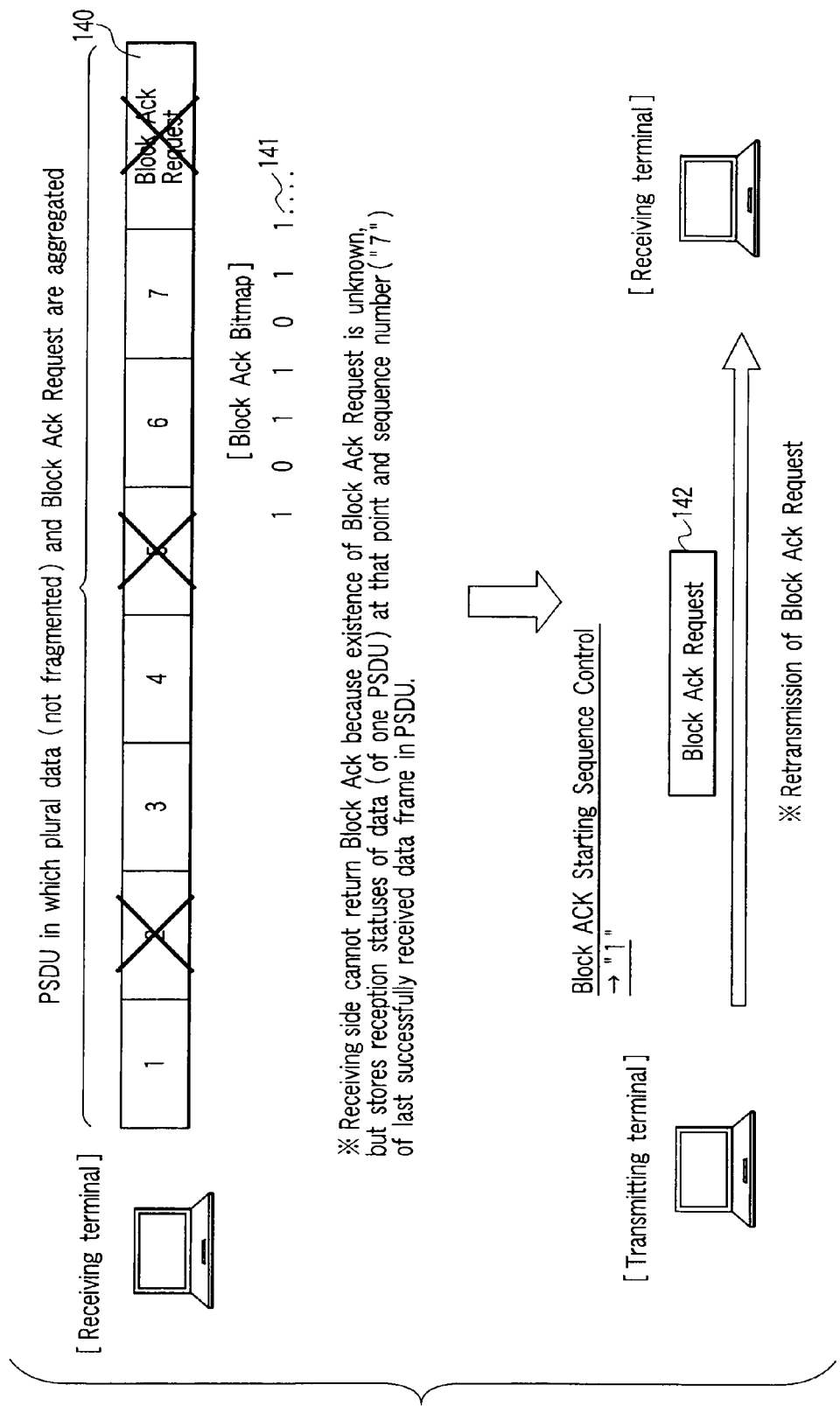
FIG. 14 is a view for explaining retransmission control example 1 according to the first embodiment.
Figure 15:
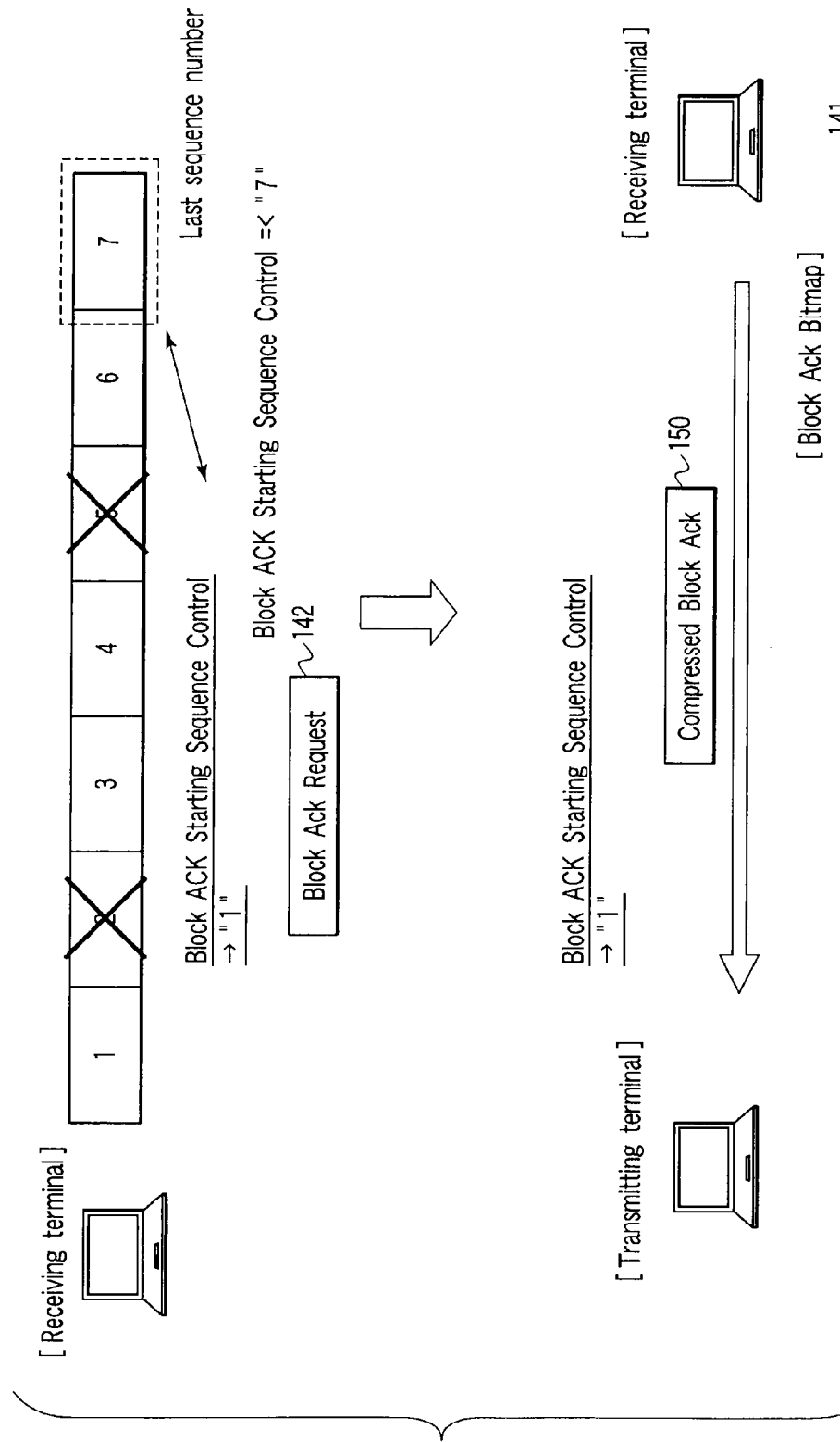
FIG. 15 is a view for explaining retransmission control example 1 according to the first embodiment.

First, retransmission control example 1 will be described with reference to FIGS. 14 to 16. In this example, assume that a data transmitting terminal aggregates MPDUs having sequence numbers "1" to "7" into one PSDU, aggregates a Block Ack Request to the end of this PSDU, and transmits it. As shown in the example of FIG. 14, if a Block Ack Request 140 is found to be an error by FCS calculation, a receiving terminal cannot return any Compressed Block Ack. In this embodiment of the present invention, therefore, a terminal having received a PSDU in which a plurality of MPDUs are aggregated stores reception statuses of these MPDUs at that point as Block Ack Bitmap information for one Block Ack response, even thought the terminal cannot return any Compressed Block Ack. In the example shown in FIG. 14, the receiving side stores bitmap information 141 which is 1011011 . . . for one Compressed Block Ack. The receiving side also stores the sequence number of the last MPDU which the receiving side has successfully received. In FIG. 14, an MPDU having the sequence number "7" is this MPDU. The bitmap information 141 for one Compressed Block Ack and the sequence number of the last received MPDU are desirably stored for each data transmitting terminal and each priority.

If no Compressed Block Ack from the destination can be received even when a predetermined time has elapsed after the PSDU in which a plurality of MPDUs are aggregated is transmitted, the transmitting terminal retransmits a Block Ack Request by using the sequence number of the first one of the aggregated MPDUs as the value of Block Ack Starting Sequence Control. Normally, it is only necessary to retransmit a Block Ack Request aggregated in an immediately before PSDU. However, if a Block Ack Request is omitted and hence is not aggregated in an immediately before PSDU as in the second embodiment, it is necessary to newly form a Block Ack Request. In the example shown in FIG. 14, "1" of the first one of the last transmitted MPDUs having the sequence numbers "1" to "7" is described in Block Ack Starting Sequence Control. Also, a Block Ack Request 142 is basically not aggregated in any other frame. A terminal having received the Block Ack Request 142 to which no other MPDU is aggregated compares the value of Block Ack Starting Sequence Control in the Block Ack Request 142 with the value of the sequence number of an MPDU which this terminal has successfully received last. If the value of Block Ack Starting Sequence Control is equal to or less than (prior to) the sequence number of the last received MPDU, the terminal uses, as Block Ack Bitmap information, the bitmap information 141 stored for transmission of one Compressed Block Ack. After a SIFS period, as shown in FIG. 15, the terminal reflectively responds by a Compressed Block Ack 150. In the example shown in FIG. 15, the receiving terminal returns the Compressed Block Ack 150 to the transmitting terminal by using, as a Block Ack Bitmap, the reception statuses 1011011 of a plurality of MPDUs in the last received PSDU directly. The value of Block Ack Starting Sequence Control of the Block Ack Request 142 is copied as the value of Block Ack Starting Sequence Control of the Compressed Block Ack 150.

In some cases, Block Ack Starting Sequence Control used when the bitmap information 141 is formed differs from Block Ack Starting Sequence Control of the Block Ack Request 142. This occurs when the first aggregated MPDU breaks, the Block Ack Request also breaks, and the bitmap information 141 is formed by assuming that the sequence number of the first MPDU which the receiving side has successfully received is the first number. In this case, the bitmap information 141 is converted such that the sequence number of the start point of the bitmap information 141 does not conflict with the Starting Sequence Control of Block Ack Request any longer. Alternatively, the bitmap information 141 is kept unconverted, and Block Ack Starting Sequence Control of the Block Ack to be returned is set to the value used when the bitmap information 141 is formed (i.e., the value different from the Block Ack Request). Note that the receiving side may also store the first sequence number assumed when the bitmap information 141 is formed. Even if the first sequence number is not stored, it can be calculated by an inverse operation by using, e.g., the sequence number of an MPDU which is successfully received last and the bitmap information 141.

Figure 16:
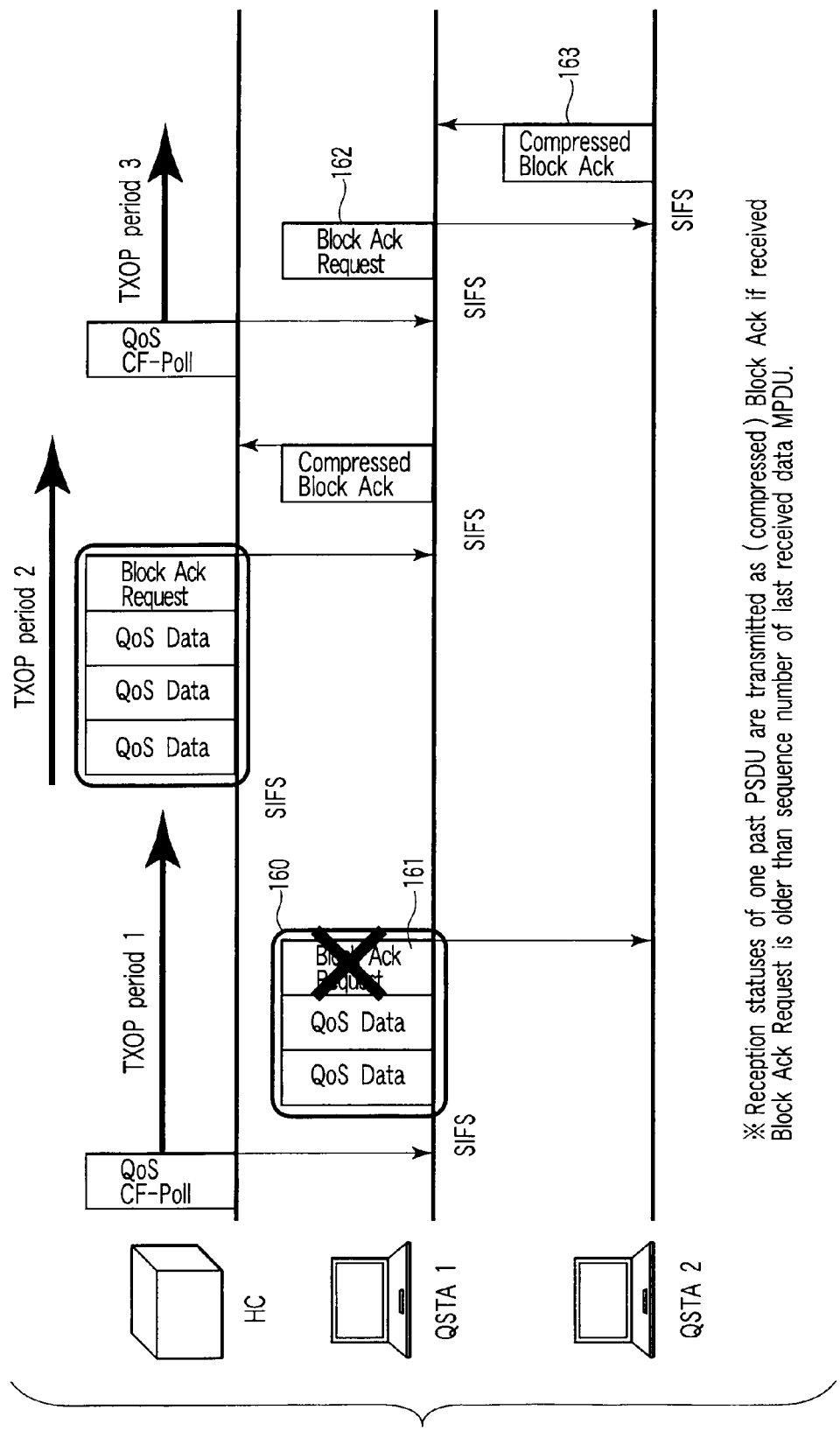
FIG. 16 is a view for explaining retransmission control example 1 according to the first embodiment.

FIG. 16 shows a sequence example according to the above control example when a Block Ack Request is retransmitted. An HC transmits QoS CF-Poll to QSTA 1 to assign it TXOP period 1. Referring to FIG. 16, within the range of the TXOP period, QSTA 1 aggregates a plurality of QoS data frames and one Block Ack Request into one physical frame 160, and transmits it to QSTA 2. However, an error occurs in a Block Ack Request 161, so no Compressed Block Ack can be received. After that, when TXOP period 2 of QSTA 2 expires and the HC assigns TXOP period 3 to QSTA 1 again, QSTA 1 retransmits a Block Ack Request 162 and receives a Compressed Block Ack 163 from QSTA 2. In this manner, a series of frame sequences are complete.

Figure 17:
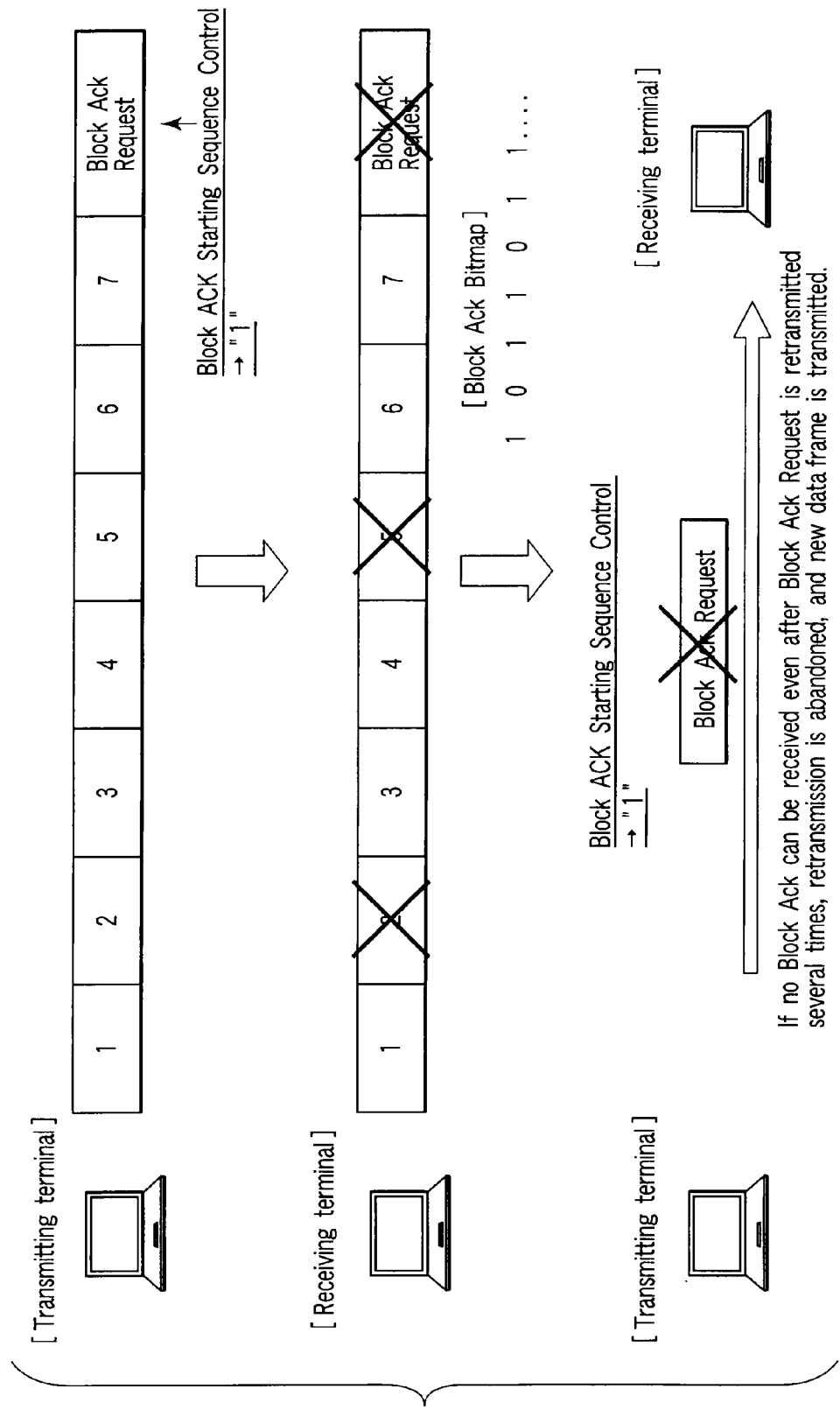
FIG. 17 is a view for explaining retransmission control example 2 according to the first embodiment.

Retransmission control example 2 will be described below with reference to FIGS. 17 to 19. Assume, as shown in FIG. 17, that a transmitting terminal transmits MPDUs having sequence numbers "1" to "7" and a Block Ack Request by aggregating them into one PSDU. The receiving side determines as a result of error check that the sequence numbers "2" and "5" and the Block Ack Request are not successfully received, and holds, as bitmap information (in the example shown in FIG. 17, the bit map is 1011011), reception statuses of the MPDUs of the PSDU received at that point. The receiving side also stores the sequence number (in the example shown in FIG. 17, the sequence number "7") of the last received MPDU. The foregoing is the same as in the above-mentioned example.

In the example shown in FIG. 17, the data receiving terminal cannot return a Compressed Block Ack. Therefore, if no Compressed Block Ack can be received even after an elapse of a predetermined time, the transmitting terminal retransmits a Block Ack Request. As described above, the sequence number (in the example shown in FIG. 17, "1") of the first aggregated MPDU is described as the value of Block Ack Starting Sequence Control of the Block Ack Request. If no Compressed Block Ack is returned even though this Block Ack Request is transmitted, the transmitting terminal gives up retransmission of the data. According to IEEE 802.11e Draft 8.0, QoS data has a Delay Bound corresponding to each priority, The Delay Bound specifies the maximum amount of time, in units of microseconds, allowed to transport an MSDU, measured between time marking the arrival of the MSDU at the local MAC sublayer from the local MAC-SAP (Service Access Point) and the time of completion of the successful transmission or retransmission of the MSDU tu the destination. A MAC frame having exceeded this Delay Bound is discarded by the transmitting terminal, because this MAC frame cannot satisfy QoS requirement. In the example shown in FIG. 17, if all the MAC frames of sequence numbers "1" to "7" aggregated and transmitted by the transmitting terminal have exceeded the Delay Bound and are discarded, new frames are aggregated as the next transmission sequence.

Figure 18:
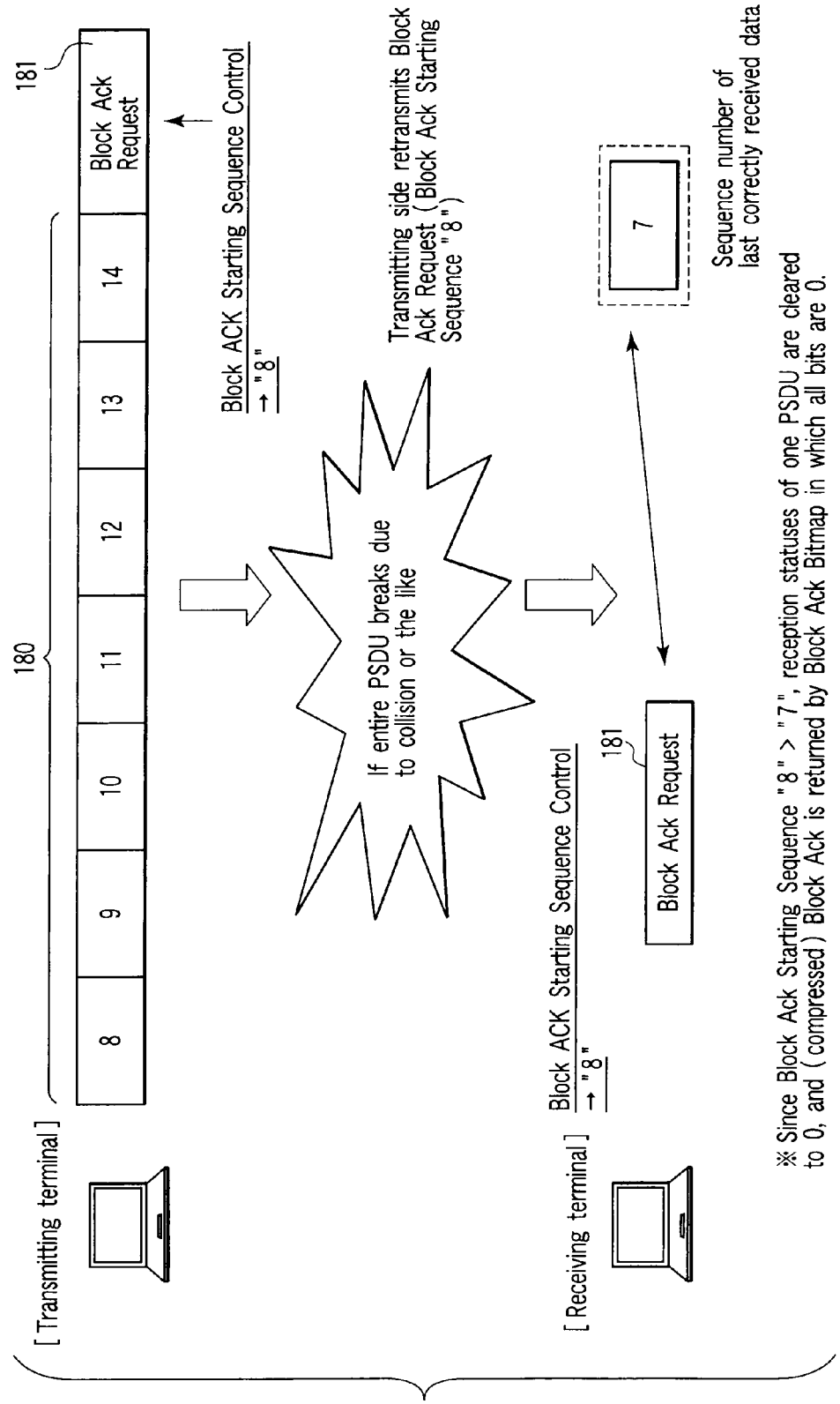
FIG. 18 is a view for explaining retransmission control example 2 according to the first embodiment.

In the example shown in FIG. 18, MPDUs 180 having sequence numbers "8" to "14" and a Block Ack Request 181 are transmitted as they are aggregated into one PSDU. The sequence number "8" of the first MPDU is described as the value of Block Ack Starting Sequence Control of the Block Ack Request 181 aggregated to the end of the PSDU. If this PSDU in which the MPDUs (sequence numbers "8" to "14") 180 and Block Ack Request 181 are aggregated is entirely an error due to collision or the like, the receiving terminal does not update any reception statuses at all. If no Compressed Block Ack can be received even after an elapse of a predetermined time, the transmitting terminal retransmits the Block Ack Request 181 in which Block Ack Starting Sequence Control is "8". Upon receiving the retransmitted Block Ack Request 181, the receiving side detects that the value of Block Ack Starting Sequence Control of the frame 181 is "8" which is larger than the sequence number "7" of the last MPDU which the receiving side has successfully received. In the example shown in FIG. 18, bitmap information for one Compressed Block Ack corresponds to the MPDUs having the sequence numbers "1" to "7", so no previous reception statuses indicated by Block Ack Starting Sequence Control are not recorded at all. In this case, as shown in FIG. 19, the reception statuses (in the example shown in FIG. 18, 1011011) of the MPDUs having the sequence numbers "1" to "7" stored up to the point are cleared by 0, and a Compressed Block Ack 191 in which all bits of a Block Ack Bitmap 190 are 0 is transmitted. That is, the Block Ack Bitmap 190 shows that no MAC frame is successfully received.

Figure 19:
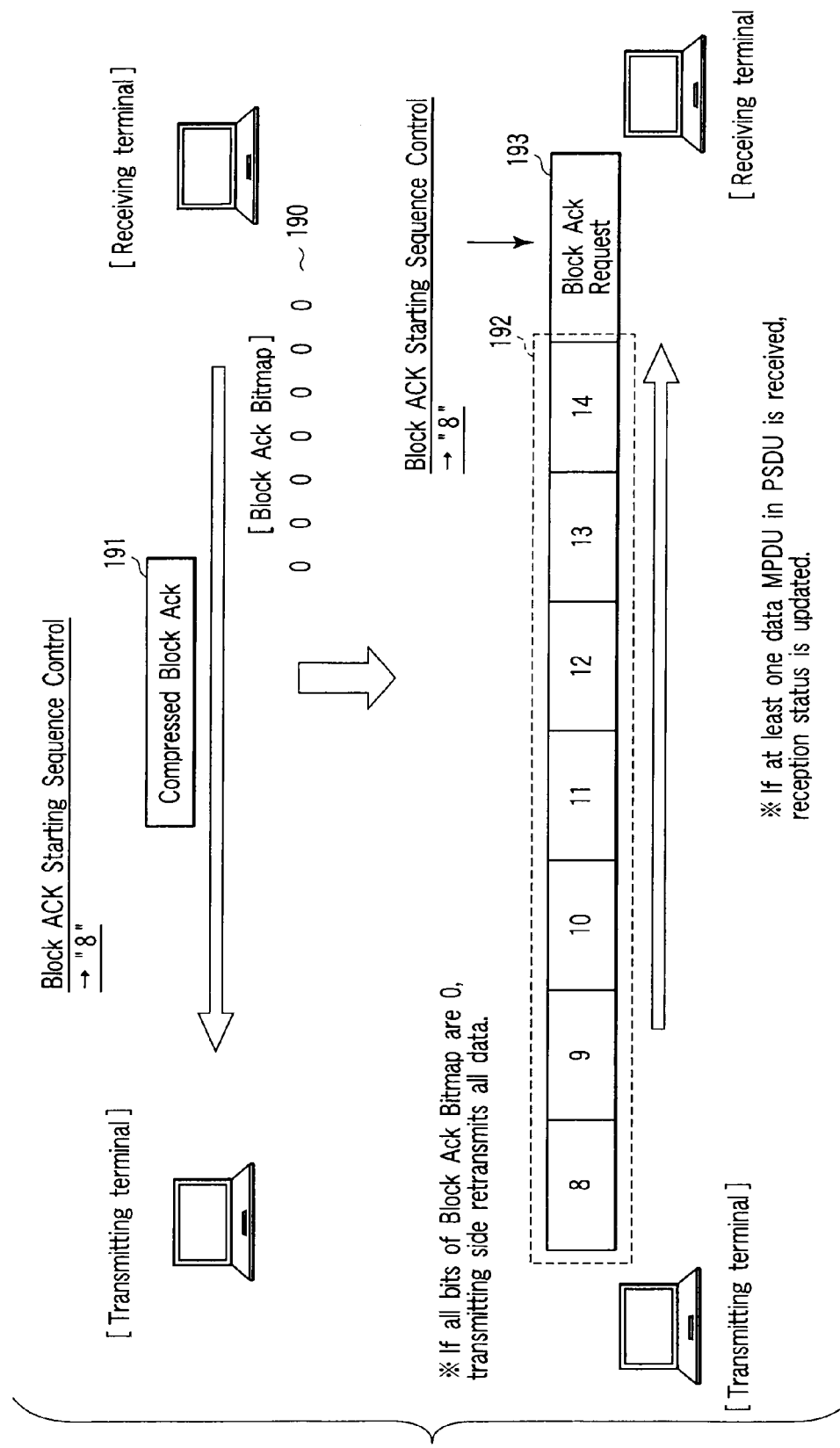
FIG. 19 is a view for explaining retransmission control example 2 according to the first embodiment.

Referring to FIG. 19, the terminal which has aggregated and transmitted the MPDUs having the sequence numbers "8" to "14" receives the Compressed Block Ack 191 from the destination terminal. If all bits of the Block Ack Bitmap 190 are 0, all MPDUs 192 having the sequence numbers "8" to "14" are objects of retransmission. In the example shown in FIG. 19, the MPDUs 192 as objects of retransmission having the sequence numbers "8" to "14" and a Block Ack Request (Block Ack Starting Sequence Control is "8") 193 are aggregated into one PSDU and transmitted. If the receiving terminal can successfully receive any one of the MPDUs 192, except for the Block Ack Request 193, aggregated in the PSDU, it updates the bitmap of the reception statuses and the sequence number of an MPDU which is successfully received last.

In the first embodiment of the present invention described above, it is possible to reduce bitmap information contained in a Block Ack and increase the MAC efficiently on the assumption that MSDUs are not fragmented. In this embodiment, the examples of implementation of Immediate Block Ack in which a Block Ack is returned when a SIFS period has elapsed after a Block Ack Request is received have been explained. More specifically, when a PSDU in which a plurality of MPDUs are aggregated and a Block Ack Request is aggregated to the end of these MPDUs is received, reception statuses can be reflectively returned as an Immediate Block Ack. However, compression of bitmap information without any fragmentation is similarly applicable to a Delayed Block Ack.

Also, in this embodiment, one Block Ack Request and one Block Ack are contained in one PSDU. However, this embodiment may also be extended such that a plurality of Block Ack Requests and a plurality of Block Ack s are contained in one PSDU. For example, when a plurality of MPDUs addressed to the same destination but having different TIDs are aggregated into one PSDU, Block Ack Requests may also be added in one-to-one correspondence with the individual TIDs contained in the PSDU. If some TIDs do not immediately require any Ack or do not require any Ack at all, the number of TIDs may also be larger than the number of Block Ack Request frames. Also, Block Ack frames to be returned are also generated and transmitted in one-to-one correspondence with these Block Ack Requests. Although it is natural to aggregate Block Ack frames to be returned into one PSDU, they may also be transmitted as different PSDUs. Furthermore, when MPDUs addressed to different destinations are aggregated into one PSDU, Block Ack Requests may also be added in one-to-one correspondence with these destinations contained in the PSDU. Block Acks to be returned are individually transmitted from receiving apparatuses corresponding to the destinations. These Block Ack responses transmitted from the receiving apparatuses are scheduled so as not to collide against each other. A plurality of TIDs and a plurality of destinations may also be combined.

This embodiment can also be similarly applied to normal CSMA/CA in which an HC does not control any scheduling.

Second Embodiment

In the first embodiment of the present invention, when a plurality of MPDUs are aggregated into one PSDU, a Block Ack Request fame is always aggregated to the end of this PSDU. In this case, a terminal having received the PSDU checks errors of the aggregated MPDUs, and, when detecting the presence of the Block Ack Request, reflectively returns a Compressed Block Ack. By contrast, in the second embodiment of the present invention, a plurality of MPDUs are aggregated into one PSDU, and a physical frame is transmitted without aggregating any Block Ack Request frame to the end of the PSDU.

Figure 20:
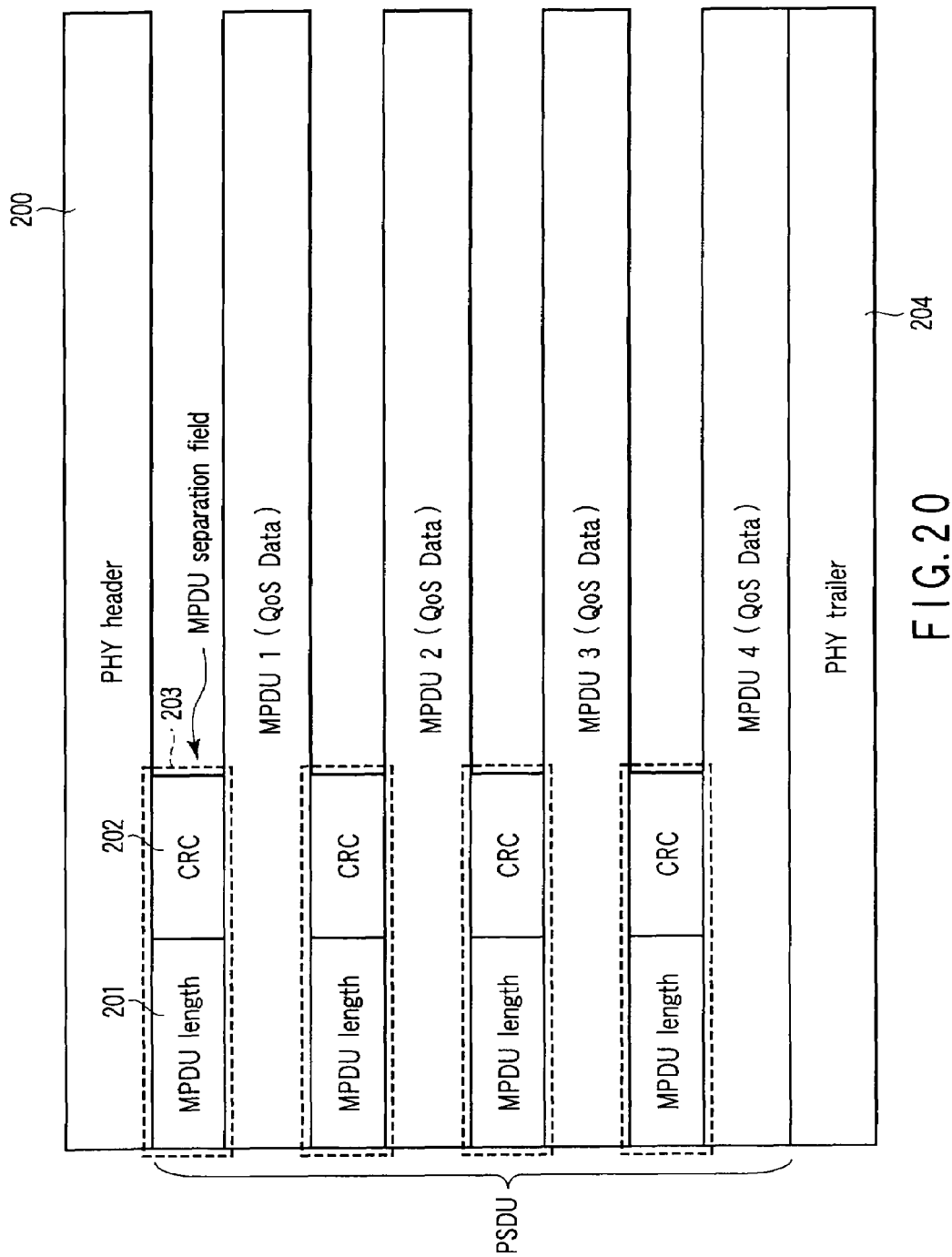
FIG. 20 is a view showing an example of a format which aggregates a plurality of MPDUs according to the second embodiment.
Figure 21:
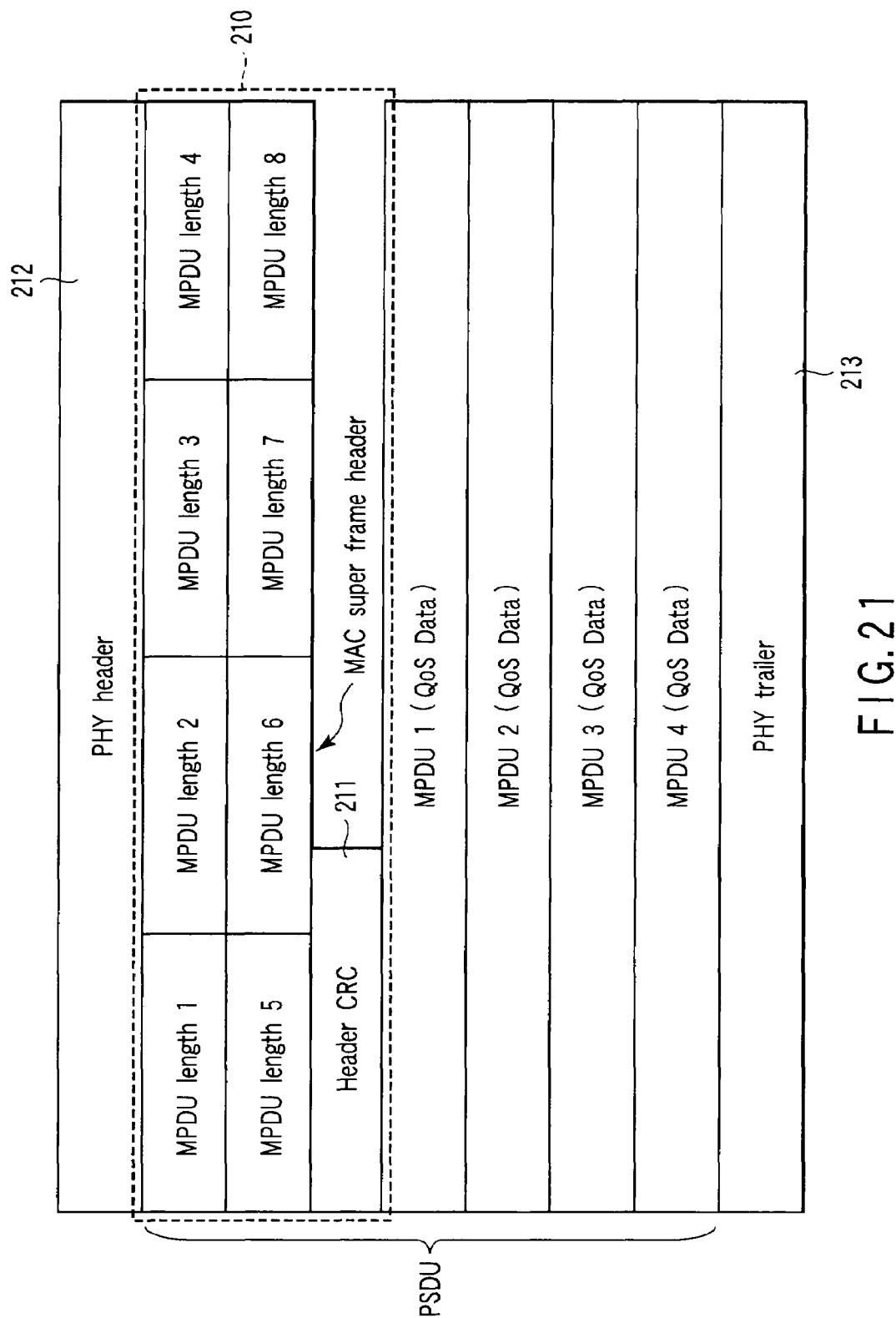
FIG. 21 is a view showing another example of the format which aggregates a plurality of MPDUs according to the second embodiment.

FIGS. 20 and 21 each show an example of the frame arrangement of a PSDU in which a plurality of MPDUs are aggregated. Referring to FIG. 20, information (MPDU length) 201 which indicates the length of an MPDU and CRC 202 for this length information are added to the head of each MPDU. As in the first embodiment, the MPDU length 201 and CRC 202 will be collectively referred to as "MPDU separation" 203 hereinafter. As shown in FIG. 20, in the second embodiment, no Block Ack Request frame exists at the end of a PSDU in which a plurality of MPDUs are aggregated. Each MPDU is regarded as being successfully received if CRC calculation of the MPDU separation 203 is correct and the result of calculation of FCS of the MPDU which is indicated by the MPDU length 201 is normal. Referring to FIG. 21, length information of a plurality of MPDUs is added as a header to the head of the aggregated MPDUs. As in the first embodiment, this header will be referred to as a "MAC super frame header" 210 hereinafter. Header CRC 211 is attached to the MAC super frame header 210. If the result of CRC calculation of the MAC super frame header 210 is an error, all the MPDUs are regarded as errors. Note that the MPDU length information designates the length from the MAC header to FCS in units of bytes. In the second embodiment, as shown in FIGS. 20 and 21, a terminal having received a physical frame in which a plurality of MPDUs are aggregated in a PSDU sandwiched between a physical (PHY) header (200 in FIG. 20, 212 in FIG. 21) and a physical (PHY) trailer (204 in FIG. 20, 213 in FIG. 21) reflectively returns reception statuses at that point as a Compressed Block Ack.

Figure 22:
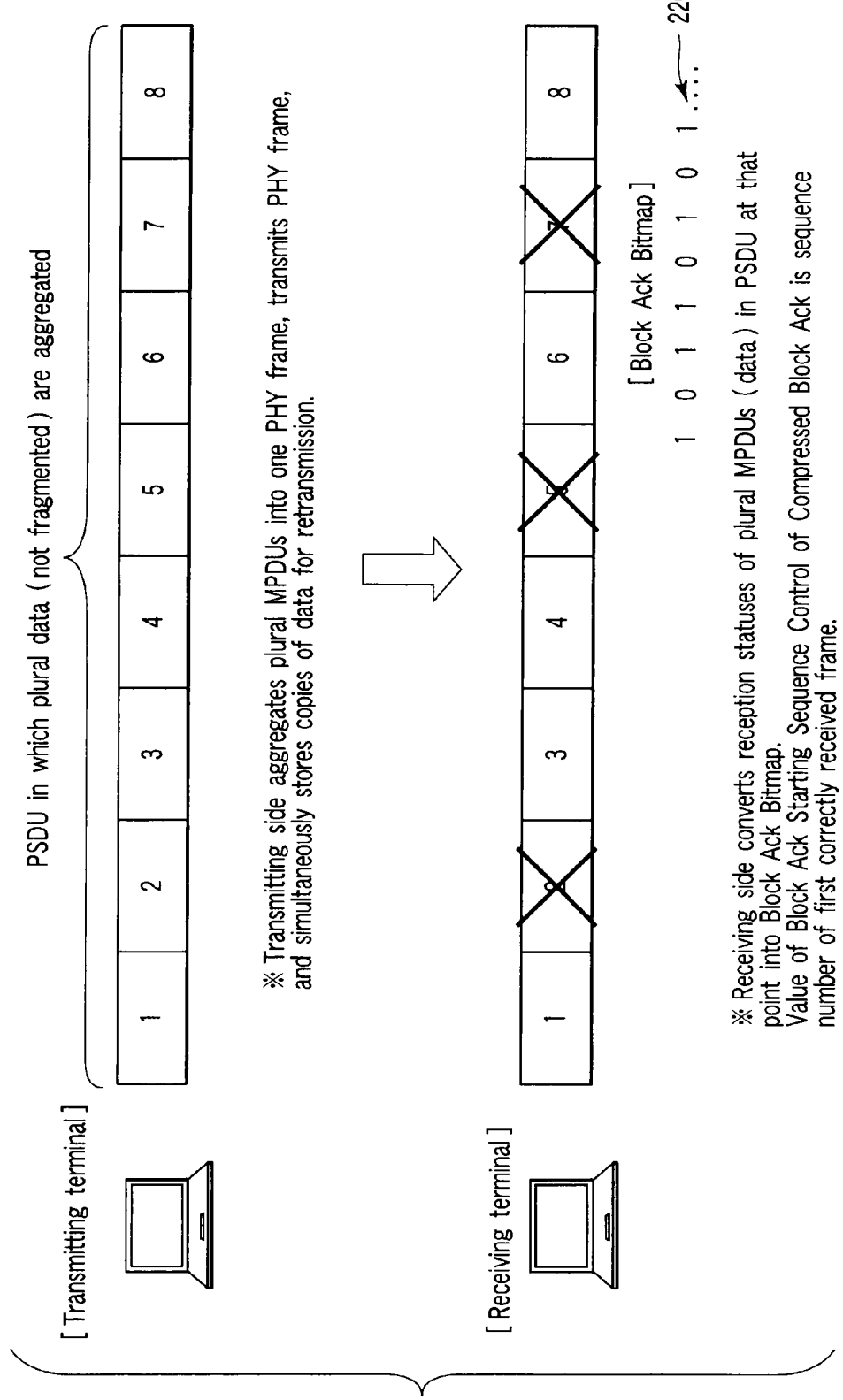
FIG. 22 is a view for explaining an example of a retransmission procedure when a Block Ack Request is omitted according to the second embodiment.
Figure 23:
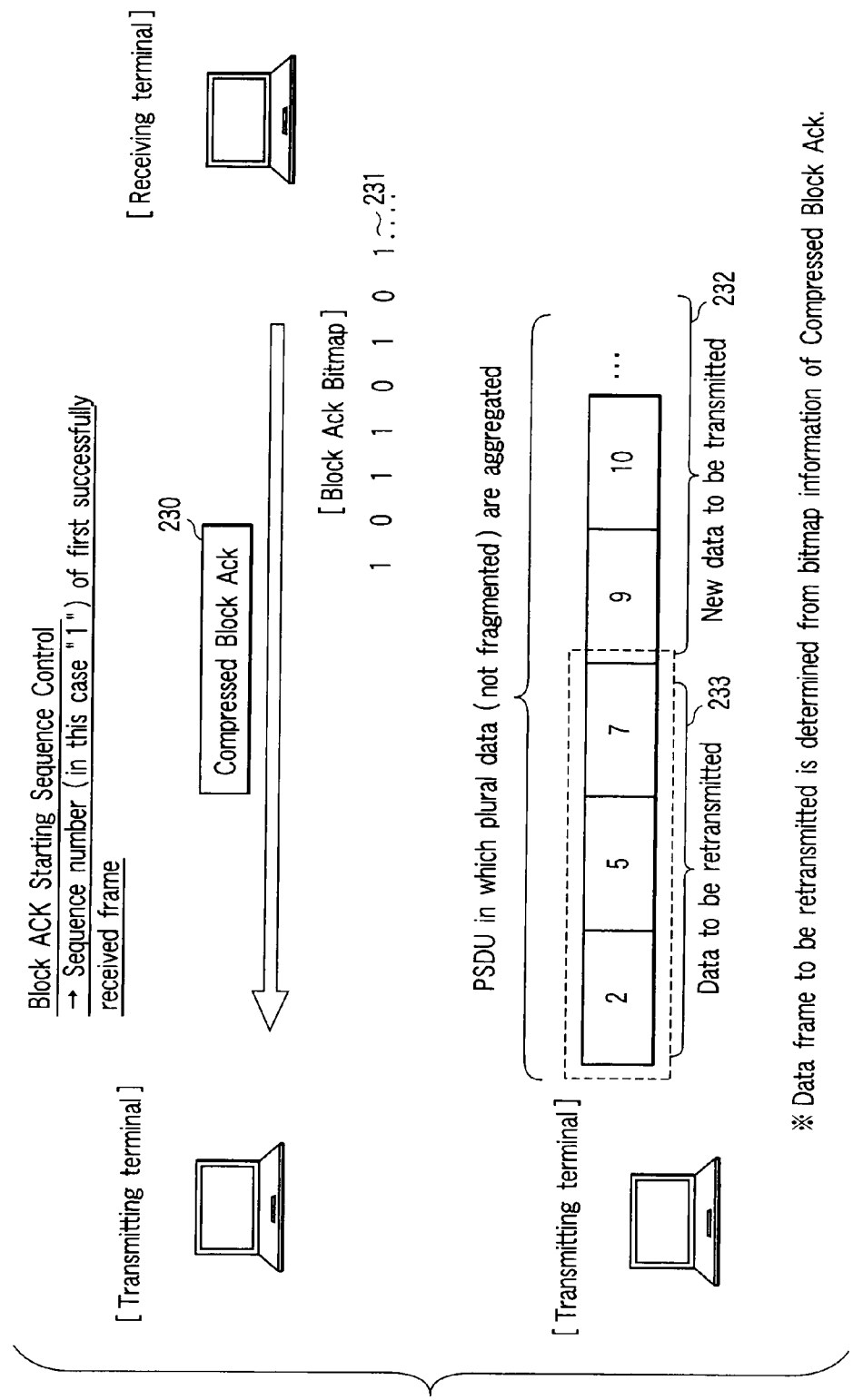
FIG. 23 is a view for explaining the example of the retransmission procedure when a Block Ack Request is omitted according to the second embodiment.

The basic transmission/reception sequence of the second embodiment of the present invention will be described below with reference to FIGS. 22 to 24. In FIG. 22, a transmitting terminal aggregates MPDUs having consecutively assigned sequence numbers "1" to "8" into one PSDU, and transmits this PSDU. As in the first embodiment, the transmitting terminal has a subqueue for retransmission, and stores, in this subqueue, copies of the MPDUs having the sequence numbers "1" to "8" shown in FIG. 22. In the example shown in FIG. 22, a receiving terminal having received the PSDU in which the MPDUs are aggregated calculates the reception status of each MPDU, converts the calculated reception statuses into a Block Ack Bitmap 220, and reflectively returns a Compressed Block Ack. Unlike in the first embodiment, no Block Ack Request is aggregated. Therefore, if only any one of the MPDUs in the PSDU is successfully received, the receiving terminal returns a Compressed Block Ack when this PSDU. This procedure is referred to as an "Implicit Block Ack Request". In the example shown in FIG. 22, MPDUs having the sequence numbers "2", "5", and "7" are found to be errors by the results of FCS calculations. The receiving terminal sets the sequence number of the first MPDU which is successfully received in the PSDU as the value of Block Ack Starting Sequence Control of the Compressed Block Ack. The Block Ack Bitmap 220 is formed from a relative positional relationship from this MPDU received first. Referring to FIG. 22, the bitmap arrangement of the reception statuses is 10110101 . . . . Also, Block Ack Starting Sequence Control of the Compressed Block Ack is "1". As in the first embodiment described above, if the maximum number of MPDUs which can be aggregated in one PSDU is not reached, padding or the like is performed by 0 for the latter half of the bitmap field. Alternatively, the bitmap length of the Block Ack Bitmap 220 may also be varied in accordance with the number of the MPDUs aggregated in the PSDU. Referring to FIG. 23, the data transmitting terminal having received a Compressed Block Ack 230 from the destination first checks Block Ack Starting Sequence Control of the frame 230. In the example shown in FIG. 23, this value is equal to the sequence number "1" of the first MPDU transmitted by the transmitting terminal. Therefore, the transmitting terminal determines the transmission statuses of the MPDUs transmitted by the terminal on the basis of a Block Ack Bitmap 231 of the Compressed Block Ack 230. The Block Ack Bitmap 231 shown in FIG. 23 is 10110101. As a consequence, the transmitting terminal detects that the MPDUs having the sequence numbers "2", "5", and "7" are not correctly received. Accordingly, these MPDUs having the sequence numbers "2", "5", and "7" are aggregated again as objects of retransmission. As in the first embodiment, the transmitting terminal also aggregates and transmits a new frame 232 as long as the buffer capacity of the receiving side permits. When transmitting a PSDU in which a plurality of MPDUs and a retransmission frame 233 are aggregated, the transmitting terminal does not aggregate any Block Ack Request to the end of this PSDU.

Figure 24:
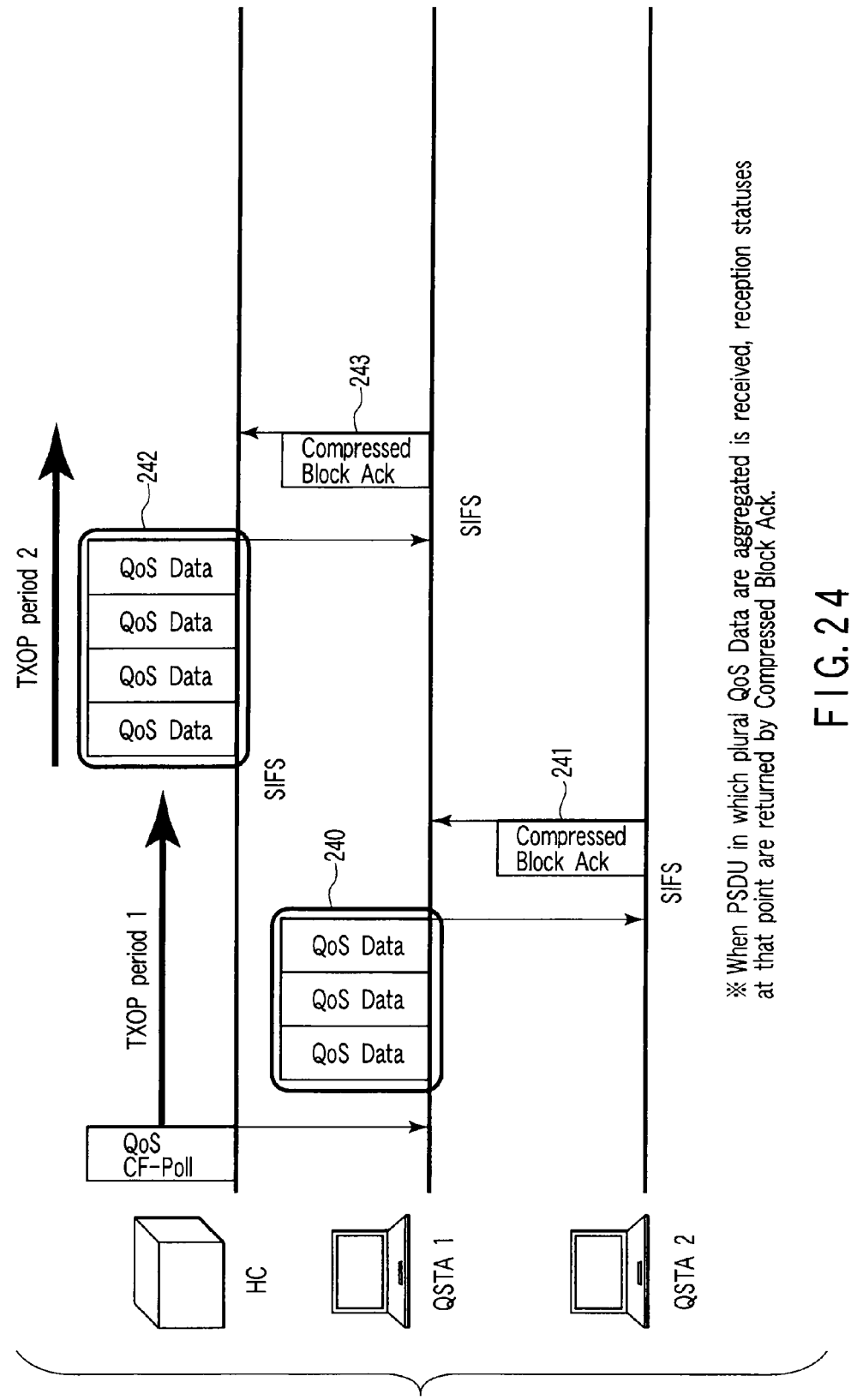
FIG. 24 is a view for explaining the example of the retransmission procedure when a Block Ack Request is omitted according to the second embodiment.

As shown in FIG. 24, QSTA 1 assigned TXOP period 1 by an HC transmits to QSTA 2 a physical frame 240 in which a plurality of QoS data are aggregated. QSTA 2 having received the frame 240 returns a Compressed Block Ack 241 after a lapse of an SIFS period. Downlink transmission from the HC to QSTA 1 is performed following the same procedure. That is, in TXOP period 2 of the HC, the HC transmits to QSTA 1 a physical frame 242 in which a plurality of QoS data are aggregated, and receives a Compressed Block Ack 243 from QSTA 1, thereby completing a series of transmission sequences.

In the second embodiment of the present invention, the MAC efficiency can be increased because no Block Ack Request frame is aggregated in a PSDU. It is also possible to reduce the load of the process of receiving a Block Ack Request frame on the receiving side.

Figure 25:
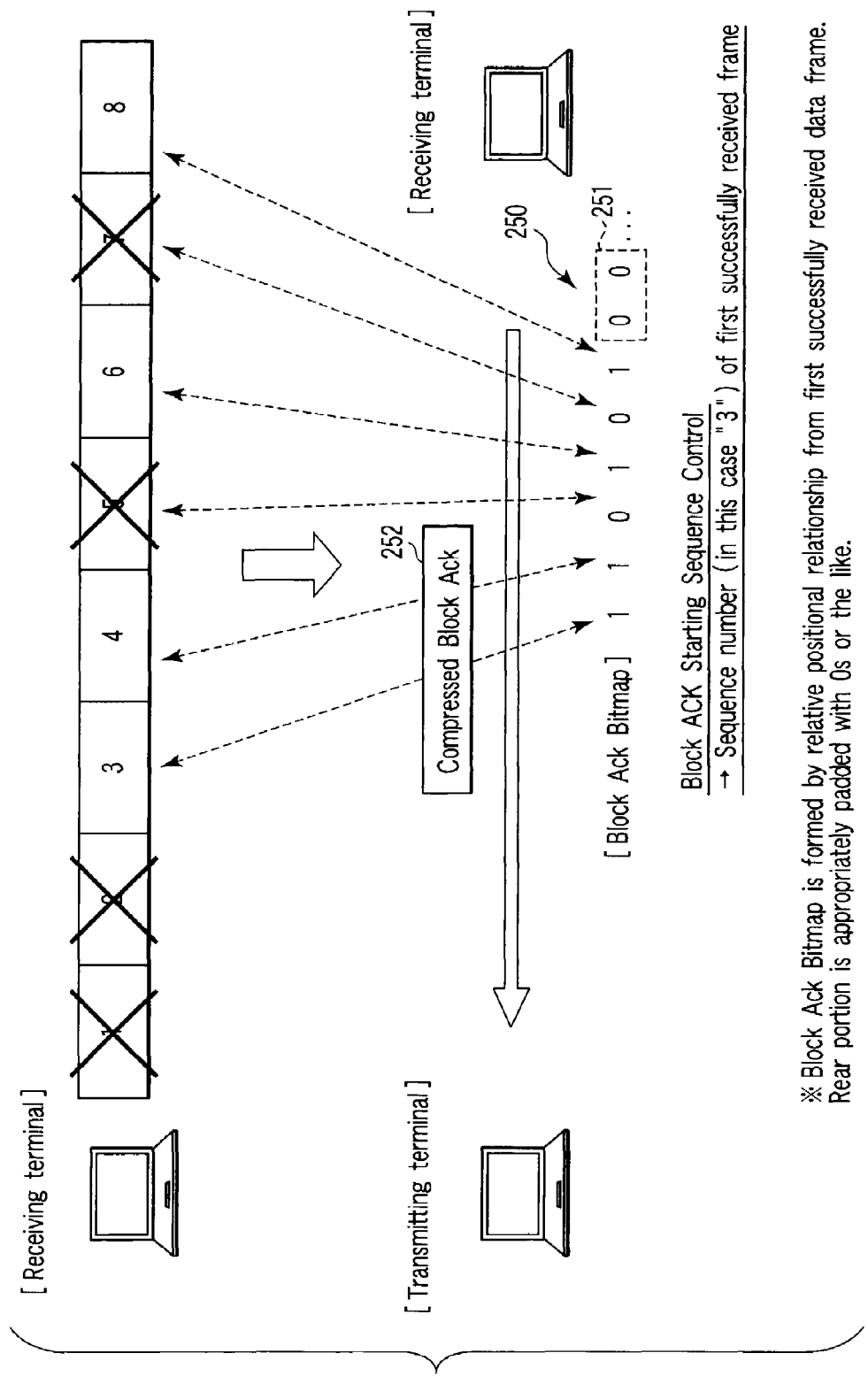
FIG. 25 is a view for explaining another example of the retransmission procedure when a Block Ack Request is omitted according to the second embodiment.

An example of retransmission control when frame errors consecutively occur from the head of a PSDU in which a plurality of MPDUs are aggregated will be explained below with reference to FIGS. 25 and 26. As shown in FIG. 25, assume that MPDUs having sequence numbers "1" to "8" are aggregated and transmitted, and a receiving terminal determines by the results of FCS calculations that MPDUs having the sequence numbers "1", "2", "5", and "7" are errors. In the second embodiment, unlike in the first embodiment, no Block Ack Request frame is aggregated in a PSDU, so the sequence number of the head of the PSDU cannot be determined. Especially when an MPDU separation field is added to the head of a plurality of MPDUs as shown in FIG. 20, the number of MPDUs aggregated in this PSDU is also unknown, so Block Ack Starting Sequence Control cannot be estimated either. In the second embodiment of the present invention, therefore, a terminal having received a PSDU in which a plurality of MPDUs are aggregated sets the sequence number of a first successfully received MPDU in the PSDU as the value of Block Ack Starting Sequence Control of a Compressed Block Ack, and forms a bitmap of reception statuses from a sequence number relation ship relative to the Block Ack Starting Sequence Control a relative positional relationship from this MPDU. That is, as shown in FIG. 25, a first MPDU which can be successfully received by a data receiving terminal is a frame having the sequence number "3". Accordingly, "3" is set as Block Ack Starting Sequence Control of a Compressed Block Ack. In addition, a Block Ack Bitmap 250 is formed on the basis of a relative positional relationship from the MPDU having the sequence number "3" in the PSDU. In the example shown in FIG. 25, a bitmap 110101 is formed. As described earlier, if the maximum number of MPDUs which can be aggregated in one PSDU is not reached, a rear portion 251 of the bitmap is padded with 0s. Alternatively, the receiving terminal may also vary the bitmap length of the Block Ack Bitmap 250 in accordance with the number of MPDUs aggregated in the PSDU. If the transmitting terminal receives a Compressed Block Ack 252 after transmitting a plurality of MPDUs by aggregating them, it compares the sequence numbers of the MPDUs transmitted by it with Block Ack Starting Sequence Control.

Figure 26:
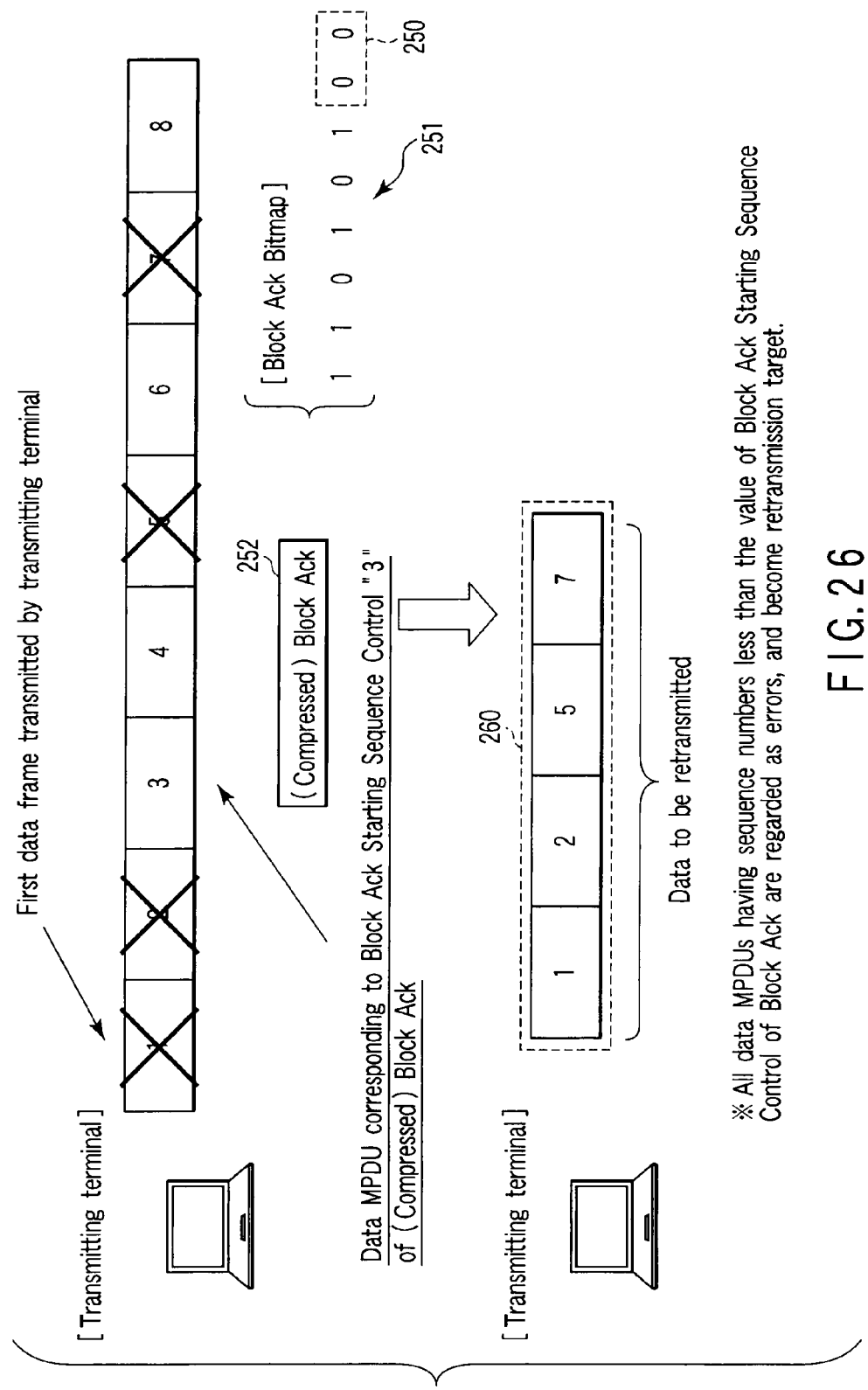
FIG. 26 is a view for explaining the other example of the retransmission procedure when a Block Ack Request is omitted according to the second embodiment.

In the example shown in FIG. 26, MPDUs having sequence numbers "1" to "8" are transmitted, and the value of Block Ack Starting Sequence Control of the Compressed Block Ack 252 from the destination terminal is "3". In this case, all MPDUs having sequence numbers less than the value of Block Ack Starting Sequence Control are regarded as errors. That is, the transmitting terminal determines that MPDUs having the sequence numbers "1" and "2" are errors. The transmitting terminal also determines that MPDUs having the sequence numbers "5" and "7" are errors, on the basis of the relative positional relationship of the bitmap starting from the value "3" of Block Ack Starting Sequence Control. Upon receiving the Compressed Block Ack 252 as described above, the transmitting terminal aggregates MPDUs 260 to be retransmitted, and, if the buffer capacity of the receiving side has an extra storage area, aggregates and transmits a new frame.

Figure 27:
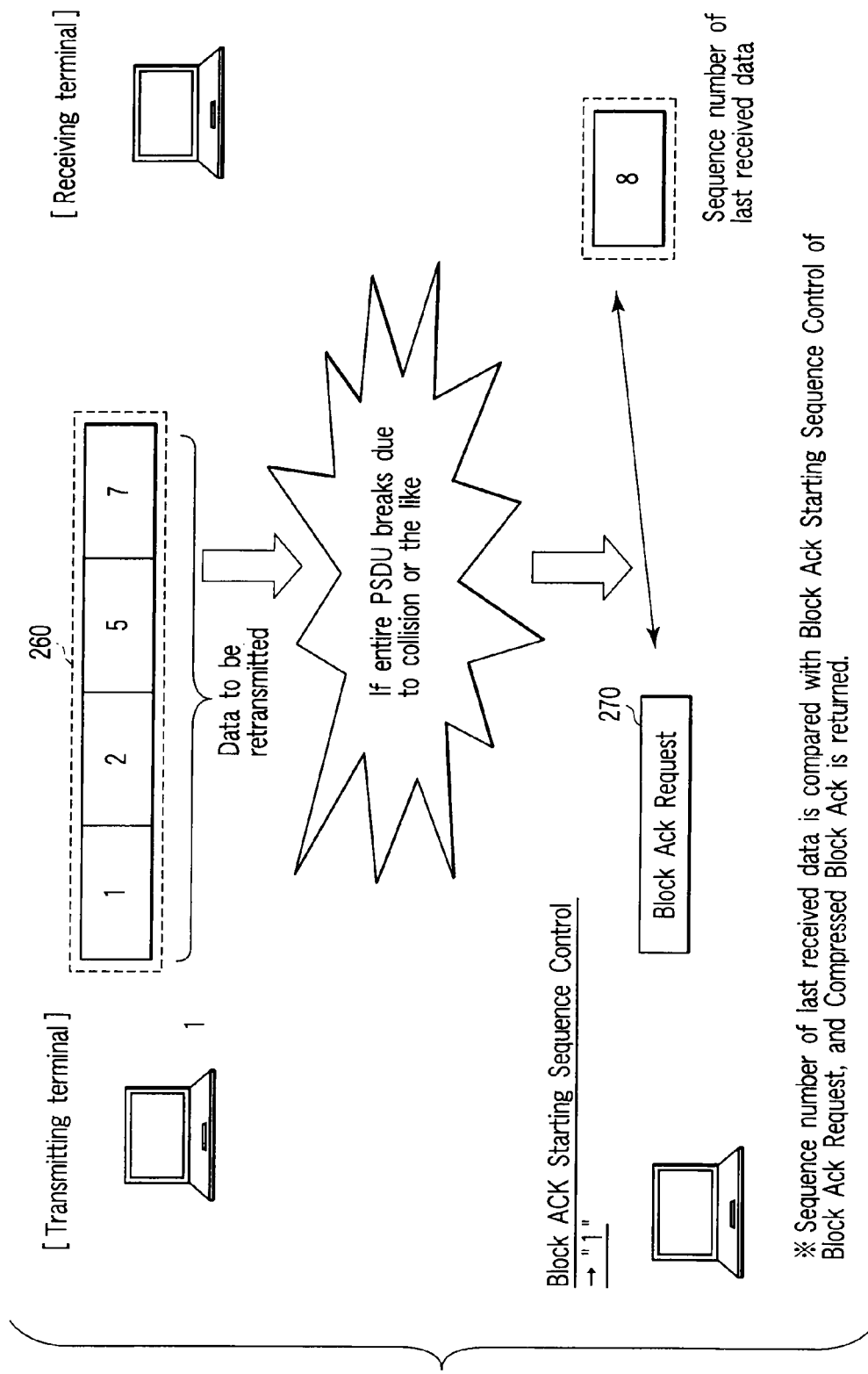
FIG. 27 is a view for explaining the other example of the retransmission procedure when a Block Ack Request is omitted according to the second embodiment.

A case in which a transmitting terminal retransmits a Block Ack Request will be explained below with reference to FIG. 27. As described in the first embodiment, if no Compressed Block Ack is received from the destination, a transmitting terminal retransmits a Block Ack Request. In the second embodiment of the present invention, when QoS data are aggregated into one physical frame, no Block Ack Request is contained in the end of this frame. Therefore, a Block Ack Request is retransmitted from a data transmitting terminal only when no Compressed Block Ack can be received. In the example shown in FIG. 27, MPDUs having sequence numbers "1", "2", "5", and "7" are aggregated and transmitted as a retransmission frame 260. In this case, the value of the sequence number of a first MPDU of a last transmitted PSDU is copied to Block Ack Starting Sequence Control of a Block Ack Request 270. Referring to FIG. 27, Block Ack Starting Sequence Control of the Block Ack Request 270 is "1". In a terminal having received the Block Ack Request 270, the reception statuses of a plurality of MPDUs in a last received PSDU are stored as one Compressed Block Ack response. If the value of Block Ack Starting Sequence Control of the Block Ack Request 270 is less than the sequence number of an MPDU which this receiving terminal has successfully received last, the receiving terminal converts the stored bitmap information directly into a Block Ack Bitmap, and reflectively returns a Compressed Block Ack. In the second embodiment, the value of Block Ack Starting Sequence Control of this Compressed Block Ack is not copied from the Block Ack Request. That is, the sequence number of a first MPDU which is successfully received in a last received PSDU is described as this value. This is so because an MPDU corresponding to Block Ack Starting Sequence Control indicated by a Block Ack Request is not always received successfully. Alternatively, it is also possible to copy Block Ack Starting Sequence Control from the Block Ack Request, and change the bitmap information to have contents indicating that a portion older than the first sequence number of the stored bitmap information is not successfully received.

Figure 28:
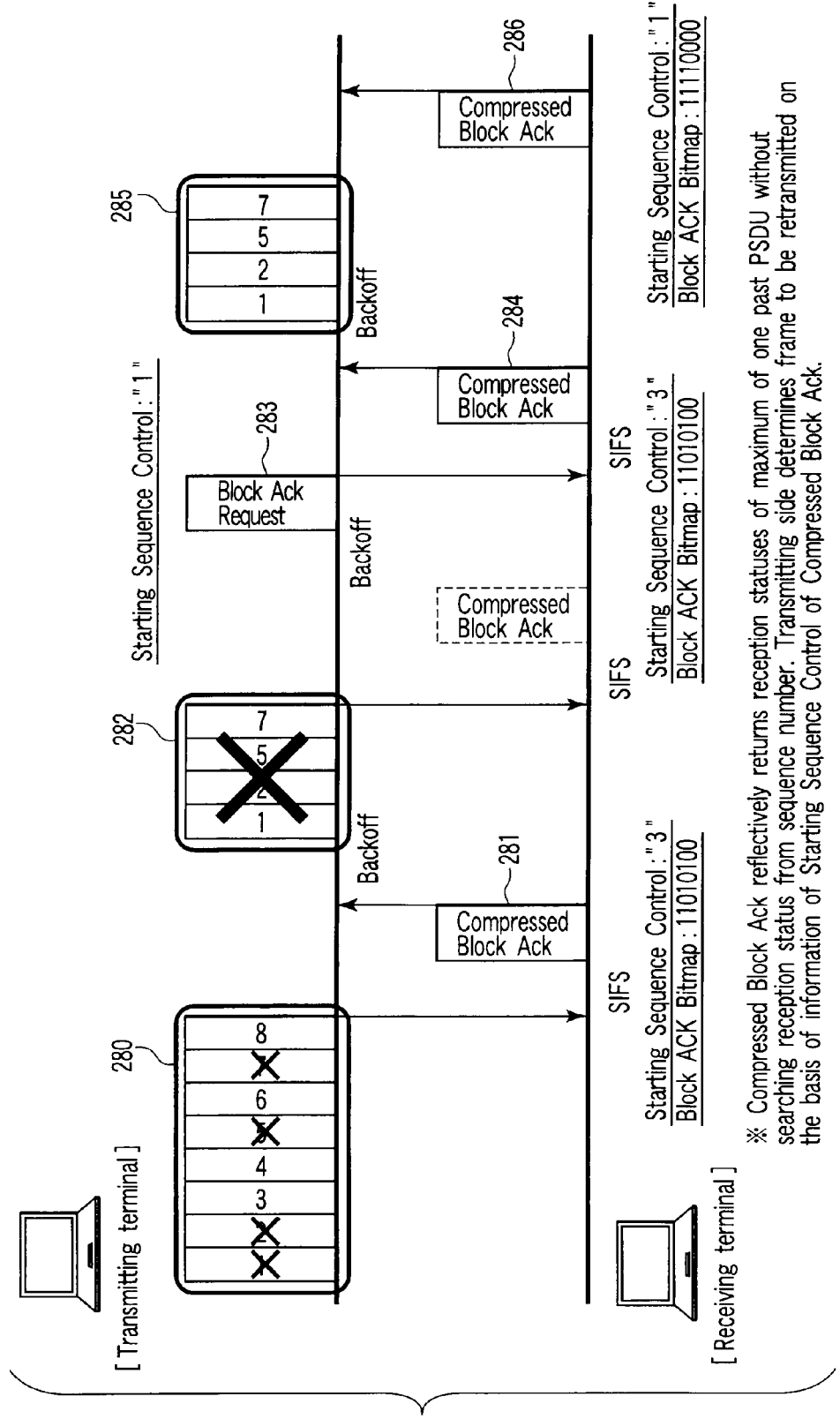
FIG. 28 is a view for explaining the other example of the retransmission procedure when a Block Ack Request is omitted according to the second embodiment.

FIG. 28 shows the basic frame exchange sequence including a retransmission process of the second embodiment of the present invention. Referring to FIG. 28, a data transmitting terminal aggregates MPDUs having sequence numbers "1" to "8" into one PSDU 280, and transmits it. The receiving side receives the PSDU 280 and, if MPDUs having the sequence numbers "1", "2", "5", and "7" are errors, transmits a Compressed Block Ack 281 having a bitmap arrangement 11010100. The transmitting side determines from the contents of the Compressed Block Ack 281 that the MPDUs having the sequence numbers "1", "2", "5", and "7" are not successfully received, and retransmits a PSDU 282 by aggregating these MPDUs to be retransmitted. If the receiving side cannot receive the retransmitted PSDU 282 at all due to collision or the like, the transmitting terminal transmits, after a predetermined time has elapsed, a Block Ack Request 283 by setting "1" as Block Ack Starting Sequence Control. Although the value of Block Ack Starting Sequence Control is "1", the sequence number of the first one of the MPDUs in the PSDU which the receiving terminal has received last is "3". Therefore, the terminal having received the Block Ack Request 283 sets "3" as the value of Block Ack Starting Sequence Control of a Compressed Block Ack 284, and returns a bitmap of stored reception statuses as a Block Ack Bitmap. The transmitting terminal having received the Compressed Block Ack 284 regards all those MPDUs in the last transmitted MPDUs 282, which have sequence numbers less than the value of Block Ack Starting Sequence Control of the Compressed Block Ack 284 as errors, and also detects error MPDUs from the Block Ack Bitmap. That is, in the example shown in FIG. 28, all the retransmitted MPDUs 282 are errors. As a consequence, the transmitting terminal regards all the MPDUs having the sequence numbers "1", "2", "5", and "7" as objects of retransmission, and transmits a PSDU 285 in which these MPDUs are aggregated. After that, the transmitting terminal receives a Compressed Block Ack 286 from the destination, thereby completing a series of frame exchange sequences.

Figure 29:
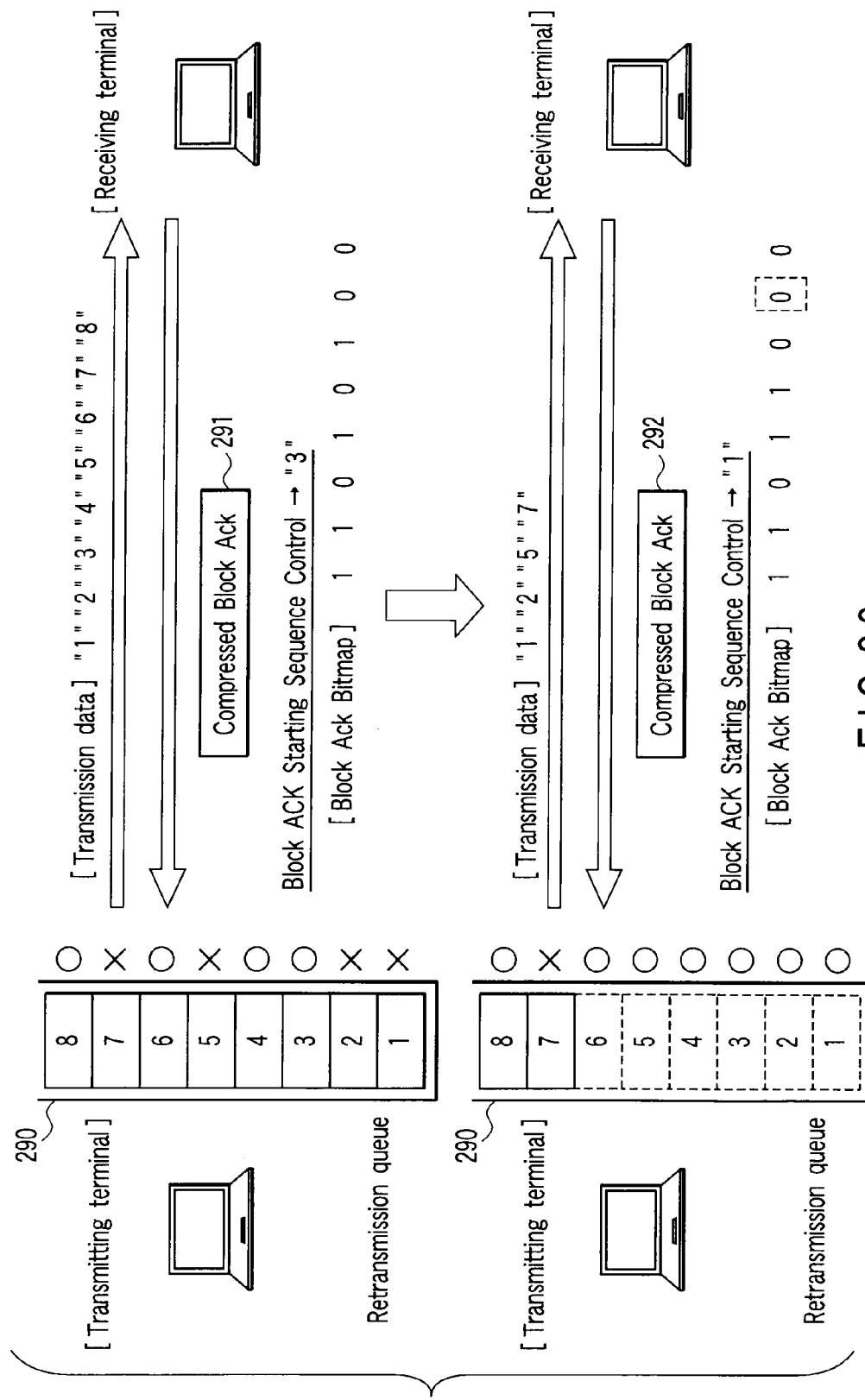
FIG. 29 is a view showing buffer management including retransmission performed by a data transmitting terminal.

FIG. 29 shows transmission buffer management including retransmission performed by a data transmitting terminal. The data transmitting terminal extracts MAC frames from a main queue including MAC frames having various destinations and various priorities, assigns consecutive sequence numbers "1" to "8" to the extracted MAC frames, and stores them in a subqueue 290 for retransmission. The transmitting terminal then extracts copies of the MPDUs having the sequence numbers "1" to "8", aggregates these copies into one PSDU, and transmits the PSDU. After that, the transmitting side stores the sequence numbers of the transmitted MPDUs. In the example shown in FIG. 29, information indicating "1", "2", "3", "4", "5", "6", "7", and "8" is stored on the transmitting side. If a Compressed Block Ack 291 in which Block Ack Starting Sequence Control is "3" is received from the destination terminal, the transmitting terminal regards both MPDUs having the sequence numbers "1" and "2" less than "3" as errors. The transmitting terminal also regards MPDUs having the sequence numbers "5" and "7" as errors from the Block Ack Bitmap. MPDUs can be deleted backward from the retransmission subqueue 290 if these MPDUs are continuously successfully transmitted from the first one. In the example shown in FIG. 29, the MPDU having the sequence number "1" is found to be an error, so no frame can be deleted from the subqueue. In this case, successfully transmitted MAC frames in the subqueue 290 are desirably kept stored in the subqueue by giving them some identification information indicating transmission success. This is so because when a Compressed Block Ack is received in the next sequence, it becomes difficult to distinguish between successfully transmitted MPDUs and MPDUs which are not successfully transmitted. The entity of a successfully transmitted MPDU need not always be stored. The state of each sequence number is important. After that, the transmitting terminal retransmits the MPDUs having the sequence numbers "1", "2", "5", and "7". If the receiving side can successfully receive all these MPDUs except for the MPDU having the sequence number "7", a Compressed Block Ack 292 in which Block Ack Starting Sequence Control is "1" is returned. The transmitting terminal determines that the MPDUs having the sequence numbers "1", "2", and "5" are successfully transmitted, and continuously deletes MPDUs from the first one to the one having the sequence number "6" from the subqueue 290. Consequently, the MPDU having the sequence number "7" is stored in the head of the subqueue 290.

In the second embodiment of the present invention as has been explained above, the MAC efficiency increases because a Block Ack Request can be deleted from a PSDU. Also, when an MSDU is not fragmented, it is possible to reduce bitmap information contained in a Block Ack, and increase the MAC efficiency. In addition, it is possible to realize Immediate Block Ack by which Block Ack is returned when an SIFS period has elapsed after a Block Ack Request is received. The method of increasing the MAC efficiency by deleting a Block Ack Request from a PSDU is also applicable to Delayed Block Ack.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus, comprising:
   a reception device configured to receive a physical frame including a first data frame and a second data frame, the data frames each including a sequence number and a Frame Check Sequence (FCS);
   a generation device configured to generate a first acknowledgement frame including a Starting Sequence Number and a bitmap, the bitmap indicating a reception status of at least one of the first data frame and the second data frame, and the generation device is configured to set the Starting Sequence Number of the first acknowledgement frame, based on one of the sequence number of the first data frame and the sequence number of the second data frame;
   a transmission device configured to transmit the first acknowledgement frame to a communication apparatus as an transmission source of the physical frame, when a minimum frame interval has elapsed after the physical frame is received by the reception device; and
   a storage which stores the bitmap included in the first acknowledgement frame,
   wherein the physical frame includes:
   a first field having the first data frame, first information indicating a length of the first data frame, a first error detection code for detecting an error occurred in the first information, and a first region for a byte alignment; and
   a second field having the second data frame, second information indicating a length of the second data frame, a second error detection code for detecting an error occurred in the second information, and a second region for the byte alignment,
   wherein the generation device determines:
   that the first data frame has been received successfully, if no error has been detected on the first information according to the first error detection code and no error has been detected on the first data frame according to the FCS of the first data frame;
   that the first data frame has not been received successfully, if an error has been detected according to the first error detection code or an error has been detected on the first data frame according to the FCS of the first data frame;
   that the second data frame has been received successfully, if no error has been detected on the second information according to the second error detection code and no error has been detected on the second data frame according to the FCS of the second data frame; and
   that the second data frame has not been received successfully, if an error has been detected according to the second error detection code or an error has been detected on the second data frame according to the FCS of the second data frame, and
   wherein the reception device receives at least one of the first data frame and the second data frame again, depending on the sequence number of the first data frame, the sequence number of the second data frame, the Starting Sequence Number, and the bitmap, wherein the generation device generates a second acknowledgement frame, based on the bitmap stored in the storage, when the reception device receives an acknowledgement request frame and the generation device generates, if a Starting Sequence Number in the acknowledgement request frame is greater than a sequence number in a data frame that is received before reception of the acknowledgement request frame, a third acknowledgement frame indicating that no data frame has been received successfully, and wherein the transmission device transmits the second acknowledgement frame and the third acknowledgment frame.

2. The apparatus according to claim 1, wherein the minimum frame interval is a Short Interframe Space (SIFS).

3. The apparatus according to claim 1, wherein the first data frame further includes a Transmitter Address of a communication apparatus as a transmission source for the first data frame, a Receiver Address of a communication apparatus as a destination for the first data frame, and a priority identifier including a Traffic Identifier, wherein the second data frame further includes a Transmitter Address of a communication apparatus as a transmission source for the second data frame, a Receiver Address of a communication apparatus as a destination for the second data frame, and a priority identifier including a Traffic Identifier, and wherein the generation device generates the first acknowledgement frame, using a sequence number, Transmitter Address, Receiver Address, and priory identifier that are included in the first data frame or the second data frame that are determined as being successfully received.

4. The apparatus according to claim 1, further comprising an antenna, wherein the reception device receives the physical frame through the antenna, and wherein the transmission device transmits the first acknowledgement frame through the antenna.

5. A communication apparatus, comprising:

a reception device configured to receive a physical frame including a first data frame and a second data frame, the data frames each including a sequence number and a Frame Check Sequence (FCS);

a generation device configured to generate a first acknowledgement frame including a Starting Sequence Number and a bitmap, the bitmap indicating a reception status of at least one of the first data frame and the second data frame, and the generation device is configured to set the Starting Sequence Number of the first acknowledgement frame, based on one of the sequence number of the first data frame and the sequence number of the second data frame;

a transmission device configured to transmit the first acknowledgement frame to a communication apparatus as an transmission source of the physical frame, when a minimum frame interval has elapsed after the physical frame is received by the reception device; and a storage which stores the bitmap included in the first acknowledgement frame, wherein the physical frame includes:

a first field having the first data frame, first information indicating a length of the first data frame, a first error detection code for detecting an error occurred in the first information, and a first region for a byte alignment; and a second field having the second data frame, second information indicating a length of the second data frame, a second error detection code for detecting an error occurred in the second information, and a second region for the byte alignment, wherein the generation device determines:

that the first data frame has been received successfully, if no error has been detected on the first information according to the first error detection code and no error has been detected on the first data frame according to the FCS of the first data frame;

that the first data frame has not been received successfully, if an error has been detected according to the first error detection code or an error has been detected on the first data frame according to the FCS of the first data frame;

that the second data frame has been received successfully, if no error has been detected on the second information according to the second error detection code and no error has been detected on the second data frame according to the FCS of the second data frame; and that the second data frame has not been received successfully, if an error has been detected according to the second error detection code or an error has been detected on the second data frame according to the FCS of the second data frame, and wherein the reception device receives at least one of the first data frame and the second data frame again, depending on the sequence number of the first data frame, the sequence number of the second data frame, the Starting Sequence Number, and the bitmap, wherein the generation device generates a second acknowledgement frame, based on the bitmap stored in the storage, when the reception device receives an acknowledgement request frame and the generation device generates, if a Starting Sequence Number in the acknowledgement request frame is less than the a sequence number in a data frame that is received before reception of the acknowledgement request frame, a third acknowledgement frame including at least part of the bitmap, and wherein the transmission device transmits the second acknowledgement frame and the third acknowledgment frame.

6. The apparatus according to claim 5, wherein the minimum frame interval is a Short Interframe Space (SIFS).

7. The apparatus according to claim 5, wherein the first data frame further includes a Transmitter Address of a communication apparatus as a transmission source for the first data frame, a Receiver Address of a communication apparatus as a destination for the first data frame, and a priority identifier including a Traffic Identifier, wherein the second data frame further includes a Transmitter Address of a communication apparatus as a transmission source for the second data frame, a Receiver Address of a communication apparatus as a destination for the second data frame, and a priority identifier including a Traffic Identifier, and wherein the generation device generates the first acknowledgement frame, using a sequence number, Transmitter Address, Receiver Address, and priory identifier that are included in the first data frame or the second data frame that are determined as being successfully received.

8. The apparatus according to claim 5, further comprising an antenna,
   wherein the reception device receives the physical frame through the antenna, and
   wherein the transmission device transmits the first acknowledgement frame through the antenna.

9. A communication method implemented by a communication apparatus, the method comprising:
   receiving a physical frame including a first data frame and a second data frame, the data frames each including a sequence number and a Frame Check Sequence (FCS);
   generating a first acknowledgement frame including a Starting Sequence Number and a bitmap, the bitmap indicating a reception status of at least one of the first data frame and the second data frame;
   setting the Starting Sequence Number of the first acknowledgement frame, based on one of the sequence number of the first data frame and the sequence number of the second data frame;
   transmitting the first acknowledgement frame to the communication apparatus as a transmission source of the physical frame, when a minimum frame interval has elapsed after the physical frame is received; and
   storing in a storage the bitmap included in the first acknowledgement frame,
   wherein the physical frame includes:
   a first field having the first data frame, first information indicating a length of the first data frame, a first error detection code for detecting an error occurred in the first information, and a first region for a byte alignment; and
   a second field having the second data frame, second information indicating a length of the second data frame, a second error detection code for detecting an error occurred in the second information, and a second region for the byte alignment,
   wherein in the generating, it is determined:
      that the first data frame has been received successfully, if no error has been detected on the first information according to the first error detection code and no error has been detected on the first data frame according to the FCS of the first data frame,
      that the first data frame has not been received successfully, if an error has been detected according to the first error detection code or an error has been detected on the first data frame according to the FCS of the first data frame,
      that the second data frame has been received successfully, if no error has been detected on the second information according to the second error detection code and no error has been detected on the second data frame according to the FCS of the second data frame, and
      that the second data frame has not been received successfully, if an error has been detected according to the second error detection code or an error has been detected on the second data frame according to the FCS of the second data frame;
   receiving at least one of the first data frame and the second data frame again, depending on the sequence number of the first data frame, the sequence number of the second data frame, the Starting Sequence Number, and the bitmap;
   generating a second acknowledgement frame, based on the bitmap stored in the storage, when an acknowledgement request frame is received;
   generating, if a Starting Sequence Number in the acknowledgement request frame is greater than a sequence number in a data frame that is received before reception of the acknowledgement request frame, a third acknowledgement frame indicating that no data frame has been received successfully; and
   transmitting the second acknowledgement frame and the third acknowledgment frame.

10. The method according to claim 9, wherein the minimum frame interval is a Short Interframe Space (SIFS).

11. A communication method implemented by a communication apparatus, the method comprising:
   receiving a physical frame including a first data frame and a second data frame, the data frames each including a sequence number and a Frame Check Sequence (FCS);
   generating a first acknowledgement frame including a Starting Sequence Number and a bitmap, the bitmap indicating a reception status of at least one of the first data frame and the second data frame;
   setting the Starting Sequence Number of the first acknowledgement frame, based on one of the sequence number of the first data frame and the sequence number of the second data frame;
   transmitting the first acknowledgement frame to the communication apparatus as a transmission source of the physical frame, when a minimum frame interval has elapsed after the physical frame is received; and
   storing in a storage the bitmap included in the first acknowledgement frame,
   wherein the physical frame includes:
   a first field having the first data frame, first information indicating a length of the first data frame, a first error detection code for detecting an error occurred in the first information, and a first region for a byte alignment; and
   a second field having the second data frame, second information indicating a length of the second data frame, a second error detection code for detecting an error occurred in the second information, and a second region for the byte alignment,
   wherein in the generating, it is determined:
      that the first data frame has been received successfully, if no error has been detected on the first information according to the first error detection code and no error has been detected on the first data frame according to the FCS of the first data frame,
      that the first data frame has not been received successfully, if an error has been detected according to the first error detection code or an error has been detected on the first data frame according to the FCS of the first data frame,
      that the second data frame has been received successfully, if no error has been detected on the second information according to the second error detection code and no error has been detected on the second data frame according to the FCS of the second data frame, and
      that the second data frame has not been received successfully, if an error has been detected according to the second error detection code or an error has been detected on the second data frame according to the FCS of the second data frame;
   receiving at least one of the first data frame and the second data frame again, depending on the sequence number of the first data frame, the sequence number of the second data frame, the Starting Sequence Number, and the bitmap;

generating a second acknowledgement frame, based on the bitmap stored in the storage, when an acknowledgement request frame is received;

generating, if a Starting Sequence Number in the acknowledgement request frame is less than a sequence number in a data frame that is received before reception of the acknowledgement request frame, a third acknowledgement frame including at least part of the bitmap; and transmitting the second acknowledgement frame and the third acknowledgment frame.

12. The method according to claim 11, wherein the minimum frame interval is a Short Interframe Space (SIFS).

* * * * *